(12) United States Patent
Shrinath et al.

(10) Patent No.: US 9,383,214 B2
(45) Date of Patent: Jul. 5, 2016

(54) NAVIGATION SYSTEM WITH DEVICE RECOGNITION MECHANISM AND METHOD OF OPERATION THEREOF

(71) Applicant: Telenav, Inc., Sunnyvale, CA (US)

(72) Inventors: Arjun Shrinath, Sunnyvale, CA (US); Harris Warren, Los Gatos, CA (US); Md Ahsan Habib, Santa Clara, CA (US)

(73) Assignee: TELENAV, INC., Santa Clara, CA (US)

( * ) Notice: Subject to any disclaimer, the term of this patent is extended or adjusted under 35 U.S.C. 154(b) by 92 days.

(21) Appl. No.: 14/231,081

(22) Filed: Mar. 31, 2014

(65) Prior Publication Data

US 2015/0276415 A1 Oct. 1, 2015

(51) Int. Cl.
| | | |
|---|---|---|
| G01C 21/34 | (2006.01) | |
| H04M 1/66 | (2006.01) | |
| H04M 1/725 | (2006.01) | |
| G01C 21/36 | (2006.01) | |
| G05D 1/00 | (2006.01) | |

(52) U.S. Cl.
CPC ............... *G01C 21/34* (2013.01); *G01C 21/36* (2013.01); *G05D 1/0016* (2013.01); *H04M 1/66* (2013.01); *H04M 1/725* (2013.01); *G01C 21/362* (2013.01)

(58) Field of Classification Search
CPC ........ H04M 1/66; H04M 1/725; G01C 21/20; G01C 21/3697
USPC ........ 701/36; 455/404.1, 404.2, 422.1, 456.1, 455/456.3, 456.4
See application file for complete search history.

(56) References Cited

U.S. PATENT DOCUMENTS

| | | | | |
|---|---|---|---|---|
| 7,590,405 | B2 * | 9/2009 | Ewell, Jr. ................ | H04M 1/66 342/357.75 |
| 8,380,161 | B2 * | 2/2013 | Ewell, Jr. ................ | H04M 1/66 455/404.1 |
| 8,385,880 | B2 * | 2/2013 | Ewell, Jr. ................ | H04M 1/66 455/404.1 |
| 8,706,143 | B1 * | 4/2014 | Elias ....................... | H04W 48/04 455/1 |
| 2007/0218891 | A1 * | 9/2007 | Cox ......................... | G01C 21/20 455/422.1 |
| 2012/0190386 | A1 * | 7/2012 | Anderson ............... | G01C 15/04 455/456.3 |
| 2015/0141043 | A1 * | 5/2015 | Abramson .............. | G01C 21/34 455/456.1 |
| 2015/0191178 | A1 * | 7/2015 | Roy ....................... | B60W 40/09 701/36 |

OTHER PUBLICATIONS

Dock-n-Lock, "distracted driving solutions", Copyright 2012, http://www.dock-n-lock.com/products/fleet/surgeon/how-it-works.
Stoptxting, "By Safe Operating Solutions SOS", Copyright 2010-2013, http://www.stoptxting.com/.

* cited by examiner

*Primary Examiner* — Thomas G Black
*Assistant Examiner* — Wae Louie
(74) *Attorney, Agent, or Firm* — IP Investment Law Group

(57) ABSTRACT

A method of operation of a navigation system includes: accessing a device identification for identifying a device; generating a maneuver-relative status corresponding to the device identification with a control unit for representing the device associated with maneuvering a vehicle; and generating a device function profile corresponding to the device identification based on the maneuver-relative status for controlling the device or the vehicle.

20 Claims, 8 Drawing Sheets

NAVIGATION SYSTEM WITH DEVICE RECOGNITION MECHANISM AND METHOD OF OPERATION THEREOF

TECHNICAL FIELD

An embodiment of the present invention relates generally to a navigation system, and more particularly to a system with a device recognition mechanism.

BACKGROUND ART

Modern consumer and industrial electronics, especially devices such as graphical navigation systems, televisions, projectors, cellular phones, portable digital assistants, and combination devices, are providing increasing levels of functionality to support modern life including location-based information services. Research and development in the existing technologies can take a myriad of different directions.

As users become more empowered with the growth of mobile communication technology, new and old paradigms begin to take advantage of this new space. One such space is regarding interactions with the device. The possible applications for interacting with the device have yet been fully utilized.

Thus, a need still remains for a navigation system with a device recognition mechanism. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

An embodiment of the present invention provides a method of operation of a navigation system including: accessing a device identification for identifying a device; generating a maneuver-relative status corresponding to the device identification with a control unit for representing the device associated with maneuvering a vehicle; and generating a device function profile corresponding to the device identification based on the maneuver-relative status for controlling the device or the vehicle.

An embodiment of the present invention provides a navigation system, including: a storage interface for accessing a device identification for identifying a device; a control unit, coupled to the storage interface, for: generating a maneuver-relative status corresponding to the device identification for representing the device associated with maneuvering a vehicle, and generating a device function profile corresponding to the device identification based on the maneuver-relative status for controlling the device or the vehicle.

An embodiment of the present invention provides a non-transitory computer readable medium including instructions for a navigation system, including: accessing a device identification for identifying a device; generating a maneuver-relative status corresponding to the device identification with a control unit for representing the device associated with maneuvering a vehicle; and generating a device function profile corresponding to the device identification based on the maneuver-relative status for controlling the device or the vehicle.

Certain embodiments of the invention have other steps or elements in addition to or in place of those mentioned above. The steps or elements will become apparent to those skilled in the art from a reading of the following detailed description when taken with reference to the accompanying drawings.

BEST MODE FOR CARRYING OUT THE INVENTION

Figure 1:
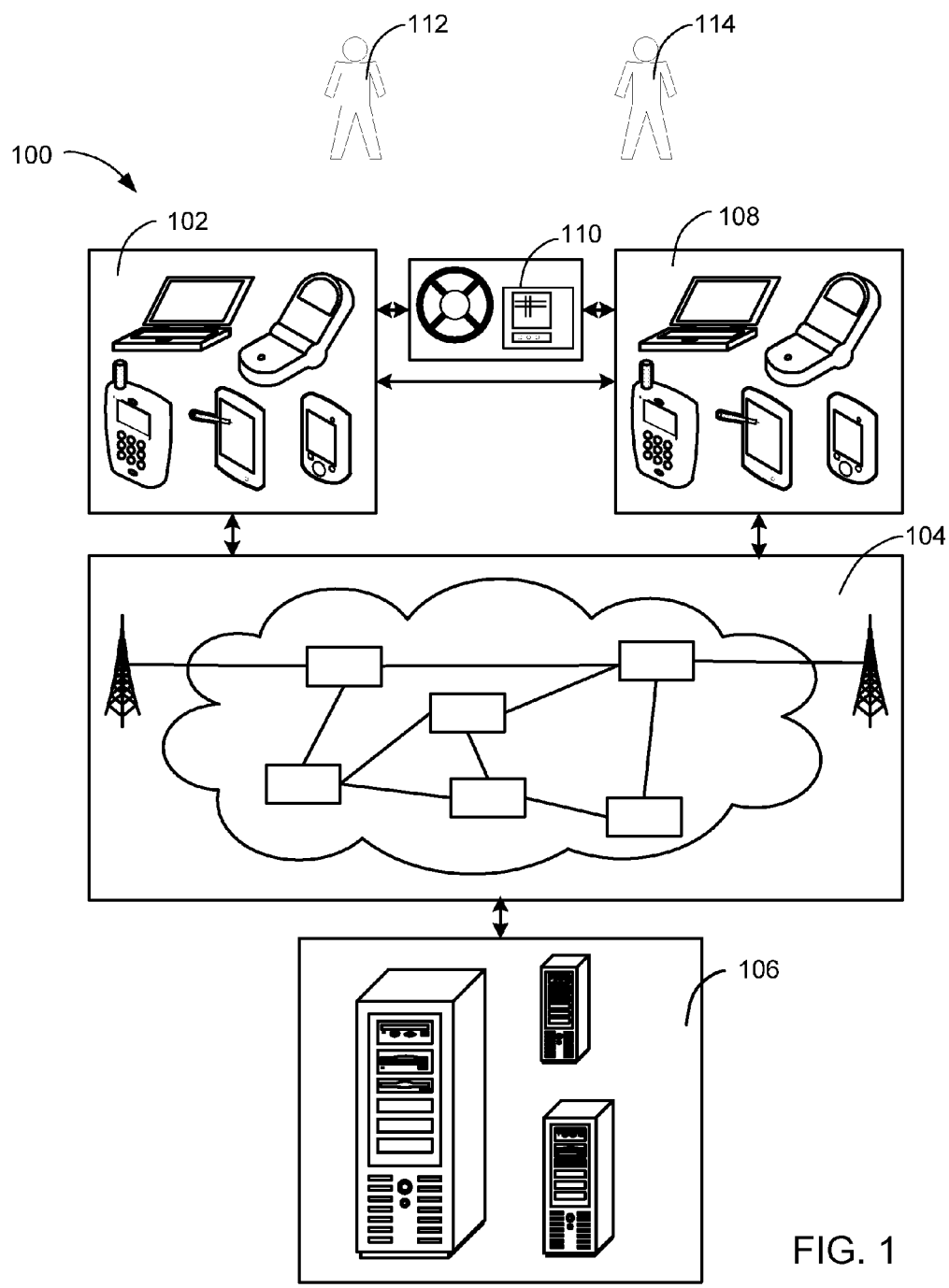
FIG. 1 is a navigation system with a device recognition mechanism in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of an embodiment of the present invention.

In the following description, numerous specific details are given to provide a thorough understanding of the invention. However, it will be apparent that the invention may be practiced without these specific details. In order to avoid obscuring an embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation. The embodiments have been numbered first embodiment, second embodiment, etc. as a matter of descriptive convenience and are not intended to have any other significance or provide limitations for an embodiment of the present invention.

One skilled in the art would appreciate that the format with which navigation information is expressed is not critical to some embodiments of the invention. For example, in some embodiments, navigation information is presented in the format of (X,Y); where X and Y are two coordinates that define the geographic location, i.e., a position of a user.

In an alternative embodiment, navigation information is presented by longitude and latitude related information. In a further embodiment of the present invention, the navigation information also includes a velocity element including a speed component and a heading component.

The term "relevant information" referred to herein can include the navigation information described as well as information relating to points of interest to the user, such as local business, hours of businesses, types of businesses, advertised specials, traffic information, maps, local events, and location based community or personal information.

The term "module" referred to herein can include or be implemented as software, hardware, or a combination thereof in the present invention in accordance with the context in which the term is used. For example, the software can be machine code, firmware, embedded code, and application software. The software can also include a function, a call to a function, a code block, or a combination thereof. Also for example, the hardware can be gates, circuitry, processor, computer, integrated circuit, integrated circuit cores, a pressure sensor, an inertial sensor, a microelectromechanical system (MEMS), passive devices, physical non-transitory memory medium having instructions for performing the software function, a portion therein, or a combination thereof.

Referring now to FIG. 1, therein is shown a navigation system 100 with a device recognition mechanism in an embodiment of the present invention. The navigation system 100 includes a first device 102, such as a client or a server, connected to a second device 106, such as a client or server. The first device 102 can communicate with the second device 106 with a network 104, such as a wireless or wired network.

For example, the first device 102 can be of any of a variety of consumer devices, such as a cellular phone, personal digital assistant, a notebook computer, automotive telematics navigation system, or other multi-functional mobile communication or entertainment device. The first device 102 can couple, either directly or indirectly, to the network 104 to communicate with the second device 106 or can be a standalone device. The first device 102 further be separate from or incorporated with a vehicle, such as a car, truck, bus, or train.

For illustrative purposes, the navigation system 100 is described with the first device 102 as a mobile computing device, although it is understood that the first device 102 can be different types of devices. For example, the first device 102 can also be a non-mobile computing device, such as a server, a server farm, or a desktop computer.

The second device 106 can be any of a variety of centralized or decentralized computing devices, or video transmission devices. For example, the second device 106 can be a computer, grid computing resources, a virtualized computer resource, cloud computing resource, routers, switches, peer-to-peer distributed computing devices, or a combination thereof.

The second device 106 can be centralized in a single room, distributed across different rooms, distributed across different geographical locations, embedded within a telecommunications network. The second device 106 can couple with the network 104 to communicate with the first device 102. The second device 106 can also be a client type device as described for the first device 102.

For illustrative purposes, the navigation system 100 is described with the second device 106 as a non-mobile computing device, although it is understood that the second device 106 can be different types of computing devices. For example, the second device 106 can also be a mobile computing device, such as notebook computer, another client device, or a different type of client device. The second device 106 can be a standalone device, or can be incorporated with a vehicle, such as a car, a truck, a bus, or a train.

Also for illustrative purposes, the navigation system 100 is described with the second device 106 as a computing device, although it is understood that the second device 106 can be different types of devices. Also for illustrative purposes, the navigation system 100 is shown with the second device 106 and the first device 102 as end points of the network 104, although it is understood that the navigation system 100 can have a different partition between the first device 102, the second device 106, and the network 104. For example, the first device 102, the second device 106, or a combination thereof can also function as part of the network 104.

The network 104 can span and represent a variety of networks. For example, the network 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the network 104. Further, the network 104 can traverse a number of network topologies and distances. For example, the network 104 can include direct connection, personal area network (PAN), local area network (LAN), metropolitan area network (MAN), wide area network (WAN), or a combination thereof.

The navigation system 100 can further include a third device 108, a fourth device 110, or a combination thereof. The third device 108, such as a client or a server, can be connected to the first device 102, the second device 106, or a combination thereof. The third device 108 can be similar to the first device 102, the second device 106, or a combination thereof.

For example, the third device 108 can include any variety of consumer devices, such as a smart phone, a tablet computer, a laptop computer, a wearable device, a health monitoring device, or a combination thereof. The third device 108 can couple, either directly or indirectly, to the network 104 to communicate with another device, couple directly to another device, or can be a stand-alone device. The third device 108 further be separate from or incorporated with a vehicle, such as a car, truck, bus, or train.

For illustrative purposes, the navigation system 100 is described with the third device 108 as a mobile computing device, although it is understood that the third device 108 can be different types of devices. For example, the third device 108 can also be a non-mobile computing device, such as a server, a server farm, or a desktop computer.

The fourth device 110, such as a client or a server, can be connected to the first device 102, the second device 106, the third device 108, or a combination thereof. The fourth device 110 can be similar to the first device 102, the second device 106, the third device 108, or a combination thereof.

For example, the third device 108 can include any variety of consumer devices, such as an integrated navigation unit, an entertainment system, a digital interface to a vehicle, or a combination thereof. The fourth device 110 can couple, either directly or indirectly, to the network 104 to communicate with another device, couple directly to another device, or can be a stand-alone device. The fourth device 110 further be separate from a vehicle, such as a car, truck, bus, or train.

For illustrative purposes, the navigation system 100 is described with the fourth device 110 as a computing device integrated into a vehicle, although it is understood that the fourth device 110 can be different types of devices. For example, the fourth device 110 can also be a non-mobile computing device, such as a desktop computer or a computing system integrated into a smart house.

The first device 102, the second device 106, the third device 108, the fourth device 110, or a combination thereof can be associated with a first user 112, a second user 114, or a combination thereof. The first user 112 can include a person or an entity owning, operating, controlling, carrying, or a combination thereof for one or more of the devices in the navigation system 100.

Similarly, the second user 114 can include a person or an entity different from the first user 112 and owning, operating, controlling, carrying, share, or a combination thereof for one or more of the devices in the navigation system 100. The first user 112 and the second user 114 can own, operate, control, carry, share, or a combination thereof for same or different devices between the first user 112 and the second user 114.

For illustrative purposes, the first user 112 will be described as being associated with the first device 102. However, it is understood that the first user 112 can be associated with different devices, such as the third device 108 or the second device 106. For further illustrative purposes, the second user 114 will be described as being associated with the third device 108. However, it is understood that the second user 114 can be associated with any other device, such as the first device 102 or the second device 106.

Also for illustrative purposes, the first user 112 will be described as operating any structure having the fourth device 110 integrated therein, such as for a driver or an owner, and the second user 114 being present in the operated structure without having designation for controlling the structure, such as for a passenger or a guest. However, it is understood that the first user 112 and the second user 114 can be different, such as having the second user 114 as the driver or the owner and the first user as the passenger or the guest.

Figure 2:
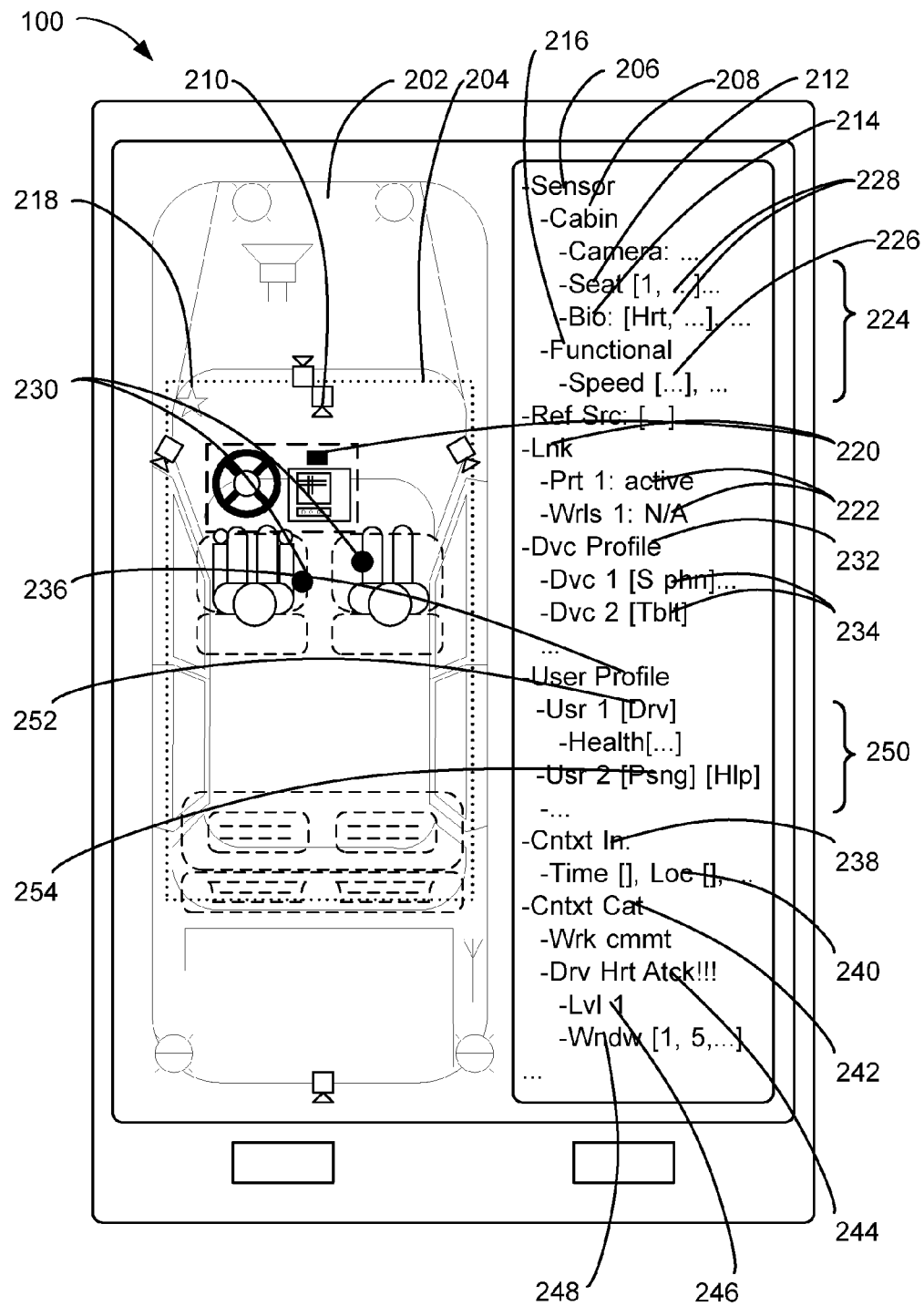
FIG. 2 is an example of a display interface of the first device of FIG. 1.

Referring now to FIG. 2, therein is shown an example of a display interface of the first device 102 of FIG. 1. The display interface can show a vehicle 202. The vehicle 202 can include a mobile machine for carrying a person, an item, or a combination thereof therein. For example, the vehicle 202 can include an automobile, an air plane, a farming machinery, a construction machinery, or a combination thereof.

The vehicle 202 can be represented using a classification, such as a sedan or a truck, a vehicle identification, such as license plate number or a make and model, an outline or a visual representation of the vehicle 202, or a combination thereof. The vehicle 202 can be operated and maneuvered by one or more person. The navigation system 100 can determine a device or a person based on operation or maneuvering of the vehicle 202. Details regarding the determination will be described below.

The vehicle 202 can include the fourth device 110 of FIG. 1 therein. The fourth device 110 can be integrated with the vehicle 202 or separately attached to the vehicle 202.

The navigation system 100 can include a cabin outline 204 for the vehicle 202. The cabin outline 204 is a representation of an area within the vehicle 202 including an interface or a controller designated for operating and maneuvering the vehicle 202. The cabin outline 204 can represent the area of the vehicle 202 designated for carrying passengers.

The vehicle 202 can include a vehicle sensor 206. The vehicle sensor 206 can include a hardware circuitry or unit for detecting or identifying information associated with the vehicle 202. For example, the vehicle sensor 206 can detect or identify information within the cabin outline 204 of the vehicle 202. Also for example, the vehicle sensor 206 can detect or identify information regarding the operation of the vehicle 202, such as for vehicle speed, remaining fuel, status of the vehicle 202 or a subsystem therein, or a combination thereof.

The vehicle sensor 206 can be coupled either directly or indirectly to the fourth device 110. The vehicle sensor 206 can further be coupled to the first device 102, the second device 106 of FIG. 1, the third device 108 of FIG. 1, the fourth device 110, or a combination thereof through the network 104 of FIG. 1.

The vehicle sensor 206 can include a cabin sensor 208, such as a cabin camera 210, a seat sensor 212, a bio-sensor 214, or a combination thereof. The cabin sensor 208 can be the hardware circuitry or unit for detecting or identifying information associated with the cabin outline 204. The cabin sensor 208 can detect or identify information relating to the first user 112 of FIG. 1, the second user 114 of FIG. 1, or a combination thereof, such as for the driver, the passenger, or a combination thereof.

The cabin camera 210 can include the hardware circuitry or unit for capturing visual image within the cabin outline 204. The cabin camera 210 can further process or analyze the captured image, such as by identifying the first user 112, the second user 114, a presence thereof, information associated thereto, or a combination thereof. For example, the cabin camera 210 can visually recognize the driver's identity, whether a passenger is within the cabin outline 204, location of the passenger within the cabin outline 204, mood or emotion of the first user 112 or the second user 114 based on facial cues, or a combination thereof.

The seat sensor 212 can include the hardware circuitry or unit specific to one or more seats within the cabin outline 204 of the vehicle 202. The seat sensor 212 can include a pressure sensor, a heat sensor, a camera, a motion sensor, or a combination thereof attached to, embedded in, focused on, or a combination thereof for the one or more seats.

The bio-sensor 214 can include the hardware circuitry or unit specific to the person of the first user 112 or the second user 114. The bio-sensor 214 can include the hardware circuitry in or attached to the vehicle 202 for identifying or detecting physiological or emotional information of the first user 112, the second user 114, or a combination thereof. For example, the bio-sensor 214 can include a biometric steering wheel capable of detecting or measuring the driver's heart rate or body temperature. Also for example, the bio-sensor 214 can include a thermal imaging camera for determining the passenger's body temperature or a facial mood recognition camera for recognizing the passenger's emotion.

The bio-sensor 214 can further include the hardware circuitry in or attached to the vehicle 202 for coupling with and communicating information with the first device 102, the second device 106, the third device 108, the fourth device 110, or a combination thereof. For example, the bio-sensor 214 can include a physical interface or a wireless connector for coupling to and communicating information with medical devices connected to the passenger or the driver, personal devices, or a combination thereof.

The vehicle sensor 206 can further include a functional sensor 216. The functional sensor 216 can include the hardware circuitry or unit in or attached to the vehicle 202 for detecting or identifying information regarding the operation of the vehicle 202. For example, the functional sensor 216 can include a speed sensor, a fuel sensor, a component status interface, or a combination thereof.

The vehicle 202 can include a reference source 218. The reference source 218 can include a location or a device for establishing a reference point for locations relative to the vehicle 202. The reference source 218 can provide an origin or a common location for comparing or describing locations of a person, a device, an object, or a combination thereof to the vehicle 202 including within the cabin outline 204. The fourth device 110 can include the reference source 218. The fourth device 110 and the reference source 218 can further be separate and independent devices.

The vehicle 202 can further include a vehicle link mechanism 220. The vehicle link mechanism 220 is a hardware circuitry in or attached to the vehicle 202 for coupling to and communicating with other devices. The vehicle link mechanism 220 can include a wired interface or a wireless interface for coupling to devices within the cabin outline 204. The vehicle link mechanism 220 can couple to a personal device of the first user 112 or the second user 114, such as the first device 102 or the third device 108. The vehicle link mechanism 220 can be included in the fourth device 110, or can be separate and independent from the fourth device 110.

The navigation system 100 can use the vehicle link mechanism 220 to exchange information between a device within the cabin outline 204 and the vehicle 202. The vehicle link mechanism 220 can include the bio-sensor 214 specific to communicating health information between a health monitoring device and the vehicle 202.

The navigation system 100 can use the vehicle link mechanism 220 to determine a vehicle link status 222, a vehicle-source data 224, or a combination thereof. The vehicle link status 222 is an indication of coupling between the vehicle 202 and a corresponding device. The vehicle link status 222 can indicate availability for exchanging information between the first device 102 and the vehicle 202. The vehicle-source data 224 is information initially identified or detected by the vehicle 202. The vehicle-source data 224 can include information from the vehicle sensor 206.

For example, the vehicle-source data 224 can include movement data 226, cabin data 228, or a combination thereof. The movement data 226 can include information related to physical movement of the vehicle 202, such as speed, location, acceleration, maneuver, or a combination thereof. The movement data 226 can include information detected, determined, or identified by the functional sensor 216. The cabin data 228 can include information related to a person, a condition, a status, or a combination thereof within the cabin outline 204. The cabin data 228 can be information from the cabin sensor 208.

The navigation system 100 can determine and use a device relative-location 230, a device profile 232, a device identification 234, a user profile 236, a contextual input 238, a contextual estimation 242, or a combination thereof. The device relative-location 230 can include a physical location of one or more device relative to the vehicle 202. For example, the device relative-location 230 can describe a geographic location of the first device 102, the second device 106, the third device 108, the fourth device 110, or a combination thereof.

The device profile 232 can include information describing a device, an owner or a user of the device, a context for the device, a record of use for the device, or a combination thereof. For example, the device profile 232 can include information describing the first device 102, the second device 106, the third device 108, the fourth device 110, the first user 112, the second user 114, information regarding interaction therebetween, or a combination thereof.

The device profile 232 can include the device identification 234 for pinpointing the device, the owner or the user, or a combination thereof. The device identification 234 can include identification information for the first device 102, the second device 106, the third device 108, the fourth device 110, the first user 112, the second user 114, or a combination thereof.

For example, the device identification 234 can include a model number, a manufacturer name, a serial number, a registration number, a license number, or a combination thereof. Also for example, the device identification 234 can include ownership information, registrant information, a user name, a login information, a digital key, or a combination thereof associated with the device.

The user profile 236 can further include information regarding user of one or more devices. For example, the user profile 236 can be for the first user 112, the second user 114, or a combination thereof. Also for example, the user profile 236 can include identification, usage record or pattern, description, medical information, historical information, contact information, or a combination thereof for the user.

The contextual input 238 is a determinable aspect of a current circumstance or situation. For example, the contextual input 238 can include current time, a current device location 240, content information, metadata, such as a title or a categorization, the user profile 236, the device profile 232, or a combination thereof.

The contextual estimation 242 is a set of circumstances or conditions surrounding a person, a device, or a combination thereof. The contextual estimation 242 can describe an event, a situation, an occasion, or a combination thereof associated with the first device 102, the second device 106, the third device 108, the fourth device 110, the first user 112, the second user 114, or a combination thereof.

For example, the contextual estimation 242 can include a reason, a purpose, a goal, a need, a requirement, or a combination thereof associated with an activity involving the first device 102, the second device 106, the third device 108, the fourth device 110, the first user 112, the second user 114, or a combination thereof. Also for example, the contextual estimation 242 can include an emergency, a deviation from a plan, or a combination thereof.

The contextual estimation 242 can be determined by the navigation system 100. The navigation system 100 can determine the contextual estimation 242 based on the contextual input 238. The navigation system 100 can determine the contextual estimation 242 for a current time, a future time, a past time, or a combination thereof.

The contextual estimation 242 can include a cabin emergency trigger 244. The cabin emergency trigger 244 is a mechanism or a tool for initiating an instruction, a step, a process or a combination thereof. The cabin emergency trigger 244 can be based on a condition or a situation within the cabin outline 204. For example, the cabin emergency trigger 244 can be based on a health-related emergency for the first user 112, the second user 114, or a combination thereof. Also for example, the cabin emergency trigger 244 can be based on a vehicle accident.

The cabin emergency trigger 244 can include a severity estimation 246, a time-window estimation 248, or a combination thereof. The severity estimation 246 is a representation of a degree of harshness, importance, urgency, or a combination thereof associated with the condition or the situation within the cabin outline 204.

The time-window estimation 248 is a representation of a duration associated with the condition or the situation within the cabin outline 204. For example, the time-window estimation 248 can include a temporal duration requiring a response or until a likely consequence.

The navigation system 100 can determine a maneuver-relative status 250. The maneuver-relative status 250 is a distinction or a recognition for a person having designation for controlling the vehicle 202. For example, the maneuver-relative status 250 can be for the first user 112, the second user 114, or a combination thereof. As a more specific example, the maneuver-relative status 250 can be for the first user 112 acting as the driver of the vehicle 202 or for the second user 114 controlling the vehicle 202 when the driver is incapacitated.

For example, the maneuver-relative status 250 can include a driver distinction 252, a passenger distinction 254, or a combination thereof. The driver distinction 252 can identify a person designated for maneuvering or controlling the vehicle 202. The driver distinction 252 can be for the person located at or near a maneuvering interface or mechanism of the vehicle 202. The driver distinction 252 can further identify one or more device owned or possessed by the person designated for maneuvering or controlling the vehicle 202. For example, the driver distinction 252 can identify the first user 112, the first device 102, or a combination thereof for the driver of the vehicle 202.

The passenger distinction 254 can identify a person not located in a position designated for maneuvering or controlling the vehicle 202. The passenger distinction 254 can identify the person located away from access to the maneuvering interface or mechanism of the vehicle 202, such as outside of a cockpit, a control room, a driver seat, or a combination thereof. For example, the passenger distinction 254 can identify the second user 114, the third device 108, or a combination thereof for the passenger of the vehicle 202.

The navigation system 100 can generate the maneuver-relative status 250 based on various incidental information as described above. The incidental information can represent information originally or initially intended for uses other than selection or identification of the maneuver-relative status 250. The navigation system 100 can further provide various functionalities based on the maneuver-relative status 250. Details regarding the generation and further use of the maneuver-relative status 250 will be described below.

Figure 3:
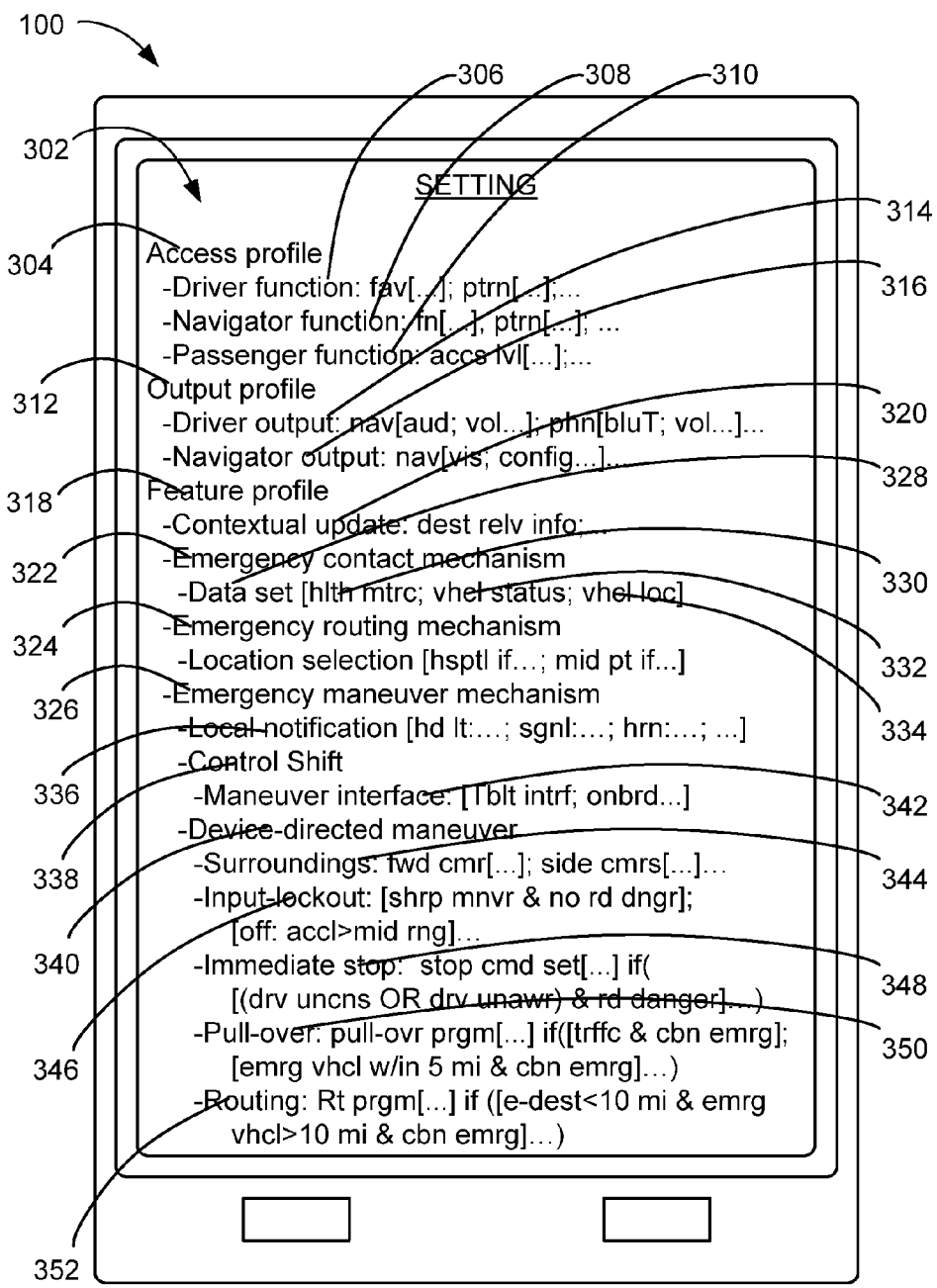
FIG. 3 is a further example of a display interface of the first device of FIG. 1.

Referring now to FIG. 3, therein is shown a further example of a display interface of the first device 102 of FIG. 1. The display interface can show a device function profile 302. The device function profile 302 is a function, a condition or a situation associated therewith, a limitation associated therewith, an accessibility associated therewith, or a combination thereof associated with the navigation system 100.

For example, the device function profile 302 can describe a function or a feature available to the first user 112 of FIG. 1, the second user 114 of FIG. 1, or a combination thereof through the first device 102, the second device 106 of FIG. 1, the third device 108 of FIG. 1, the fourth device 110 of FIG. 1, the vehicle 202 of FIG. 2, or a combination thereof. Also for example, the device function profile 302 can include a condition or a requirement for enabling or disabling access or usage of the function or the feature. Also for example, the device function profile 302 can list the function or the feature available to or unable to the first user 112, the second user 114, or a combination thereof.

The navigation system 100 can identify or determine the device function profile 302. The device function profile 302 can include an access profile 304. The access profile 304 is one or more functions or features corresponding to one or more users. The access profile 304 can identify or determine the function or the feature available to the first user 112, the second user 114, or a combination thereof. The access profile 304 can further identify the function or the feature available through the first device 102, the second device 106, the third device 108, the fourth device 110, or a combination thereof.

The access profile 304 can identify the function or the feature available or inaccessible based on a role of the first user 112, the second user 114, or a combination thereof. The access profile 304 can be based on the maneuver-relative status 250 of FIG. 2. For example, the access profile 304 can include a driver function 306, a navigator function 308, a passenger function 310, or a combination thereof.

The driver function 306 is a description of availability for one or more functions or features of the navigation system 100 to the user having designation for controlling the vehicle 202. For example, the driver function 306 can include availability of navigational functions, non-visual entertainment functions, or a combination thereof.

Also for example, the driver function 306 can include inaccessibility for features or functions requiring visual interaction, such as accessing text-based messages, visual entertainment functions, or a combination thereof, for the first user 112 with the driver distinction 252. Also for example, the driver function 306 can include features, commands, settings, or a combination thereof likely to be used by the driver. As a more specific example, the driver function 306 can include voice activated search, categories of points of interest (POI) frequented by the driver, any known driving or entertainment patterns, search patterns, or a combination thereof.

The navigator function 308 is a description of availability for one or more functions or features of the navigation system 100 to the user having designation for aiding a driver or a conductor of the vehicle 202. The navigator function 308 can be based on identifying the user not having the driver distinction 252. The navigator function 308 can be further based on the user profile 236 of FIG. 2, such as age, title, or familiarity with a relevant geographic area including current location or destination, interaction with the driver or the conductor, system input, or a combination thereof.

The navigator function 308 can include limited access or interaction with functions or features controlling the movement of the vehicle 202, instrumentations or settings of the vehicle 202, or a combination thereof. For example, the second user 114 corresponding to the navigator function 308 can include a co-captain, an assistant, an attendant, a navigator, or a combination thereof identifiable based on title, access key, or a combination thereof according to the user profile 236.

Also for example, the navigator function 308 can be based on a physical location of the user, such as the second user 114 being in the cockpit, the control room, in a seat on the side of the driver or the conductor, or a combination thereof. Also for example, the navigator function 308 can include limited control of navigation, direction, speed or acceleration, lights, ambient temperature, announcement system, emergency system, entertainment system, or a combination thereof for the vehicle 202. Also for example, the navigator function 308 can be similar to the driver function 306, such as for features, commands, settings, or a combination thereof likely to be used by the navigator.

The passenger function 310 is a description of availability for one or more functions or features of the navigation system 100 to the user unassociated with maneuvering the vehicle 202. The passenger function 310 can be similar to the navigator function 308 and be based on identifying the user, such as by the user profile 236 including age, title, or familiarity with the relevant geographic area, interaction with the driver or the conductor, system input, physical location within the vehicle 202, or a combination thereof.

The passenger function 310 can include accessibility to functions or features unrelated to maneuvering the vehicle 202, limited to the user, or a combination thereof. For example, the passenger function 310 can include accessibility for controlling devices, such as a personal display, a light, a window, a vent, or a combination thereof.

Also for example, the passenger function 310 can include accessibility limited to or designated for the passenger distinction 254 of FIG. 2, such as for volume level, content selection, or a combination thereof. Also for example, the passenger function 310 can be similar to the driver function 306, such as for features, commands, settings, or a combination thereof likely to be used by a passenger.

The device function profile 302 can include an output profile 312. The output profile 312 is a setting or a configuration for communicating information to the user. The output profile 312 can include methods, settings, or configurations based on the maneuver-relative status 250, specific to the user's role. For example, the output profile 312 can include a driver-output 314, a navigator output 316, or a combination thereof.

The driver-output 314 can include settings for communicating with the driver or the conductor of the vehicle 202. The driver-output 314 can be for the driver distinction 252. For example, the driver-output 314 can include methods unrelated to maneuvering the vehicle 202, such as by using audible methods, designated heads-up screen, or a combination thereof. Also for example, the driver-output 314 can include excluding, preventing, or delaying communication to the driver for specified information. Also for example, the driver-output 314 can include an identification of the device used for communicating with the driver, such as the first device 102, the fourth device 110, or a combination thereof.

The navigator output 316 is can include settings for communicating with the navigator or the passenger aiding the control of the vehicle 202. For example, the navigator output 316 can include methods independent of maneuvering the vehicle 202, immediate access, specific device including the third device 108 or the fourth device 110, or a combination thereof.

The device function profile 302 can include a feature profile 318. The feature profile 318 is identification of the feature or the function in relation to condition or situation associated therewith. The feature profile 318 can include a list for the feature or the function for the navigation system 100 or the devices therein. The feature profile 318 can include steps or instructions for executing the feature or the function. For example, the feature profile 318 can include a contextual update 320, an emergency contact mechanism 322, an emergency routing mechanism 324, an emergency maneuver mechanism 326, or a combination thereof.

The contextual update 320 can include information relevant to the first user 112, the second user 114, the contextual estimation 242 of FIG. 2, or a combination thereof. The navigation system 100 can identify information associated with the first user 112, the second user 114, the contextual estimation 242 of FIG. 2, or a combination thereof.

For example, the contextual update 320 can include road closure, road condition, traffic update, destination status, or a combination thereof associated with a route traversed by the first user 112, the second user 114, the vehicle 202, or a combination thereof as indicated by the contextual estimation 242. Also for example, the contextual update 320 can include location, context, status, or a combination thereof regarding a different user, such as a family member or a meeting participant, contextually relevant and associated with the contextual estimation 242.

The navigation system 100 can include a method or a process predetermined by the navigation system 100 for identifying relevant or associated information for the contextual update 320. The navigation system 100 can communicate the contextual update 320 based on the output profile 312. For example, the navigation system 100 can communicate the contextual update 320 associated with the first user 112 or the driver according to the driver-output 314. Also for example, the navigation system 100 can communicate the contextual update 320 associated with the second user 114 or the navigator according to the navigator output 316.

The emergency contact mechanism 322 is a method or a process for contacting designated parties for specified circumstances. The emergency contact mechanism 322 can be implemented with hardware circuitry, such as a wireless communication device or a processor, instructions or steps, such as software or firmware, or a combination thereof.

The emergency contact mechanism 322 can be initiated based on the cabin emergency trigger 244 of FIG. 2. The emergency contact mechanism 322 can contact and communicate with various parties. For example, the emergency contact mechanism 322 can identify and contact the designated party based on the cabin emergency trigger 244.

As a more specific example, the emergency contact mechanism 322 can include contact parties and information corresponding to various values or categories of the cabin emergency trigger 244. The emergency contact mechanism 322 can contact emergency personnel, such as hospitals or emergency service operator, family, friend, user-designated contact, or a combination thereof. Also as a more specific example, the emergency contact mechanism 322 can include instructions or steps for identifying a nearest party or entity, such as the nearest hospital or police officer, as the contacting party.

The emergency contact mechanism 322 can further include an emergency data set 328. The emergency data set 328 is information designated for communication during specific situations or conditions. For example, the emergency data set 328 can include a health metric 330, a vehicle status 332, a vehicle location 334, or a combination thereof. The emergency contact mechanism 322 can include the method or the process to determine emergency data set 328 and communicate the emergency data set 328 to the contacted party.

The health metric 330 is a description of a physiological state or condition associated with one or more person within the vehicle 202. The health metric 330 can include heart rate or blood pressure, consciousness or mood, degree of mobility, pre-existing and known health conditions, or a combination thereof. For example, the health metric 330 can include information based on the cabin sensor 208 of FIG. 2, the vehicle link mechanism 220 of FIG. 2, the user profile 236, the contextual estimation 242, the first device 102, the second device 106, the third device 108, the fourth device 110, or a combination thereof.

The health metric 330 can include information associated with the first user 112, the second user 114, any passenger within the vehicle 202, or a combination thereof. The navigation system 100 can determine the health metric 330 directly from the corresponding user, through a sensor, from external sources, such as databases or online accounts, directly from a device, or a combination thereof. The health metric 330 can include current physiological state or condition, previous state or condition, such as a medical record or a known allergy, or a combination thereof.

The vehicle status 332 can include a state or a condition of the vehicle 202. For example, the vehicle status 332 can include a representation of damage, such as location, component, severity, or a combination thereof. Also for example, the vehicle status 332 can include an amount of force received and recorded by the vehicle, such as an amount of force within a certain time period or exceeding any threshold amount. The vehicle status 332 can be determined based on the function sensor *, the vehicle link mechanism 220, the contextual estimation 242, the first device 102, the second device 106, the third device 108, the fourth device 110, or a combination thereof.

The vehicle location 334 can include a geographical position of the vehicle 202. The vehicle location 334 can include an address, a set of coordinates, a progress relative to a route, a landmark or a marker, a set of paths, or a combination thereof. The vehicle location 334 can be based on the first device 102, the second device 106, the third device 108, the fourth device 110, or a combination thereof.

The emergency routing mechanism 324 is a method or a process for calculating an emergency route to a corresponding destination. The emergency routing mechanism 324 can initiate or execute without any interaction with any user or with minimized set of interactions therewith.

The emergency routing mechanism 324 can include a selection protocol or steps for identifying one party, entity, or location based on the situation or the condition. For example, the emergency routing mechanism 324 can calculate the emergency route to the nearest hospital, the contacted party, a mid-way point between the vehicle 202 and a responding emergency vehicle, or a combination thereof.

The emergency maneuver mechanism 326 is a method or a process for controlling the vehicle 202 according to the situation or the condition without any input or interaction with the user, or with minimized set of interactions therewith. The emergency maneuver mechanism 326 can be implemented with hardware circuitry, such as an automatic pilot device or a specifically programmed chip, instructions or steps, such as software or firmware, or a combination thereof.

The emergency maneuver mechanism 326 can autonomously control the vehicle 202, enable a non-driver of the vehicle 202 to control the vehicle 202, notify immediate surroundings, or a combination thereof. For example, the emergency maneuver mechanism 326 can include a local notification 336, a control shift 338, a device-directed maneuver 340, or a combination thereof.

The local notification 336 is automated operating instructions, controls, processes, steps, or a combination thereof for controlling near-range communication devices on the vehicle 202. For example, the local notification 336 can control a head light, a horn or a speaker, a window, a signal light, a short-range wireless communication device, or a combination thereof. The local notification 336 can include the operating instructions, the controls, the processes, the steps, or a combination thereof for communicating a designated message for communicating an emergency or a request for assistance or cooperation, such as by controlling a timing, a duration, a sequence, a frequency, an intensity, or a combination thereof.

The control shift 338 is automated operating instructions, controls, processes, steps, or a combination thereof for enabling the non-driver to control or maneuver the vehicle 202. The control shift 338 can provide a maneuver interface 342 to a user without the driver distinction 252 of FIG. 2, such as the second user 114, a user of the second device 106, an emergency personnel, a service provider, or a combination thereof.

The maneuver interface 342 is a structure for controlling or maneuvering the vehicle 202 separate from a designated control or maneuver interface of the vehicle 202. For example, the maneuver interface 342 can include a device, a graphic user interface (GUI), a steering wheel, a lever, a button, a pedal, a joystick, or a combination thereof separate from instrumentation or controls integrated with the vehicle 202 and intended for providing control or maneuverability to the driver or the operator.

The control shift 338 can include the method or the process for identifying a back-up driver. The control shift 338 can identify the second user 114, a different user within the vehicle 202, the user of the second device 106, the emergency personnel, the service provider, or a combination thereof. The control shift 338 can further include the method or the process for providing the maneuver interface 342 to the back-up driver.

The navigation system 100 can communicate information from the vehicle 202, such as a view from the vehicle 202 or the vehicle-source data 224 of FIG. 2 to the back-up driver through the maneuver interface 342. The navigation system 100 can further communicate the information or control commands from the back-up driver captured through the maneuver interface 342 to the vehicle 202. The navigation system 100 can apply or execute the communicated commands on the vehicle 202 to maneuver or operate the vehicle 202 or a portion therein.

The device-directed maneuver 340 is automated operating instructions, controls, processes, steps, or a combination thereof for controlling or maneuvering the vehicle 202 or a portion therein without any input or interaction with the user or with minimized set of interactions therewith. For example, the device-directed maneuver 340 can include a surroundings profile 344, an input-lockout 346, an immediate stop scenario 348, a pull-over scenario 350, a routing scenario 352, or a combination thereof.

The surroundings profile 344 is information regarding a condition or a situation physically near the vehicle 202. For example, the surroundings profile 344 can include an image of an environment surrounding the vehicle 202. The surroundings profile 344 can include a still image or a video feed taken from one or more cameras on the vehicle 202 for capturing images outside of the vehicle 202.

Also for example, the surroundings profile 344 can include indication of existence of an object, a person, a vehicle, a structure, an obstruction, a path, a lane, a line, or a combination thereof within a threshold distance from one or more external surface or edge of the vehicle 202, a location thereof, an identification thereof, or a combination thereof. The navigation system 100 can use the various sensors to directly determine the information, process the image to further determine or recognize the information, or a combination thereof for the surroundings profile 344.

The input-lockout 346 is a process or a method for ignoring a control command or signal from the driver. The input-lockout 346 can block control commands or signals designated for the vehicle 202, the driver's device, such as the first device 102 or the fourth device 110, or a combination thereof.

The input-lockout 346 can include a condition or a situation for ignoring signals or commands from the driver, the type or value of signals or commands designated for ignoring, implementation method or steps for ignoring the signals or commands. For example, the input-lockout 346 can be initiated or implemented based on the contextual estimation 242, the user profile 236, the surroundings profile 344, the emergency data set 328, or a combination thereof. Also for example, the input-lockout 346 can include a device, such as the first device 102 or the steering wheel, a setting, such as a gear setting or a speed setting, a magnitude or an intensity, such as exceeding a specified range or rate of change, or a combination thereof for ignoring.

The input-lockout 346 can utilize various methods for ignoring the signal. For example, the input-lockout 346 can include the method or the process for utilizing an enable or a disable signal, changing a setting in a register or a profile, transitioning between states, disconnecting a link or a connection between devices or structures, not relaying a signal, or a combination thereof.

The immediate stop scenario 348 is a process or a method and corresponding a condition or a situation for stopping movement of the vehicle 202. The immediate stop scenario 348 can include instances or values of sensor values, the contextual estimation 242, the user profile 236, the surroundings profile 344, or a combination thereof corresponding to autonomously stopping movement of the vehicle 202. The immediate stop scenario 348 can include steps, instructions, control signals, or a combination thereof for stopping movement of the vehicle 202, such as by applying brakes, ignoring direction controls, or a combination thereof.

The pull-over scenario 350 is a process or a method and corresponding a condition or a situation for maneuvering the vehicle 202 to a stop at a designated location. The pull-over scenario 350 can include instances or values of sensor values, the contextual estimation 242, the user profile 236, the surroundings profile 344, or a combination thereof for identifying or selecting the designated location and for autonomously maneuvering the vehicle 202 to a stop at the designated location. The pull-over scenario 350 can include steps, instructions, control signals, or a combination thereof for maneuvering the vehicle 202 to a stop at the designated location.

The routing scenario 352 is a process or a method and corresponding a condition or a situation for maneuvering the vehicle 202 to traverse the emergency route calculated by the emergency routing mechanism 324. The routing scenario 352 can include instances or values of sensor values, the contextual estimation 242, the user profile 236, the surroundings profile 344, or a combination thereof for triggering instructions or steps for maneuvering the vehicle 202 to traverse the emergency route. The routing scenario 352 can include steps, instructions, control signals, or a combination thereof for maneuvering the vehicle 202 to traverse the emergency route.

Figure 4:
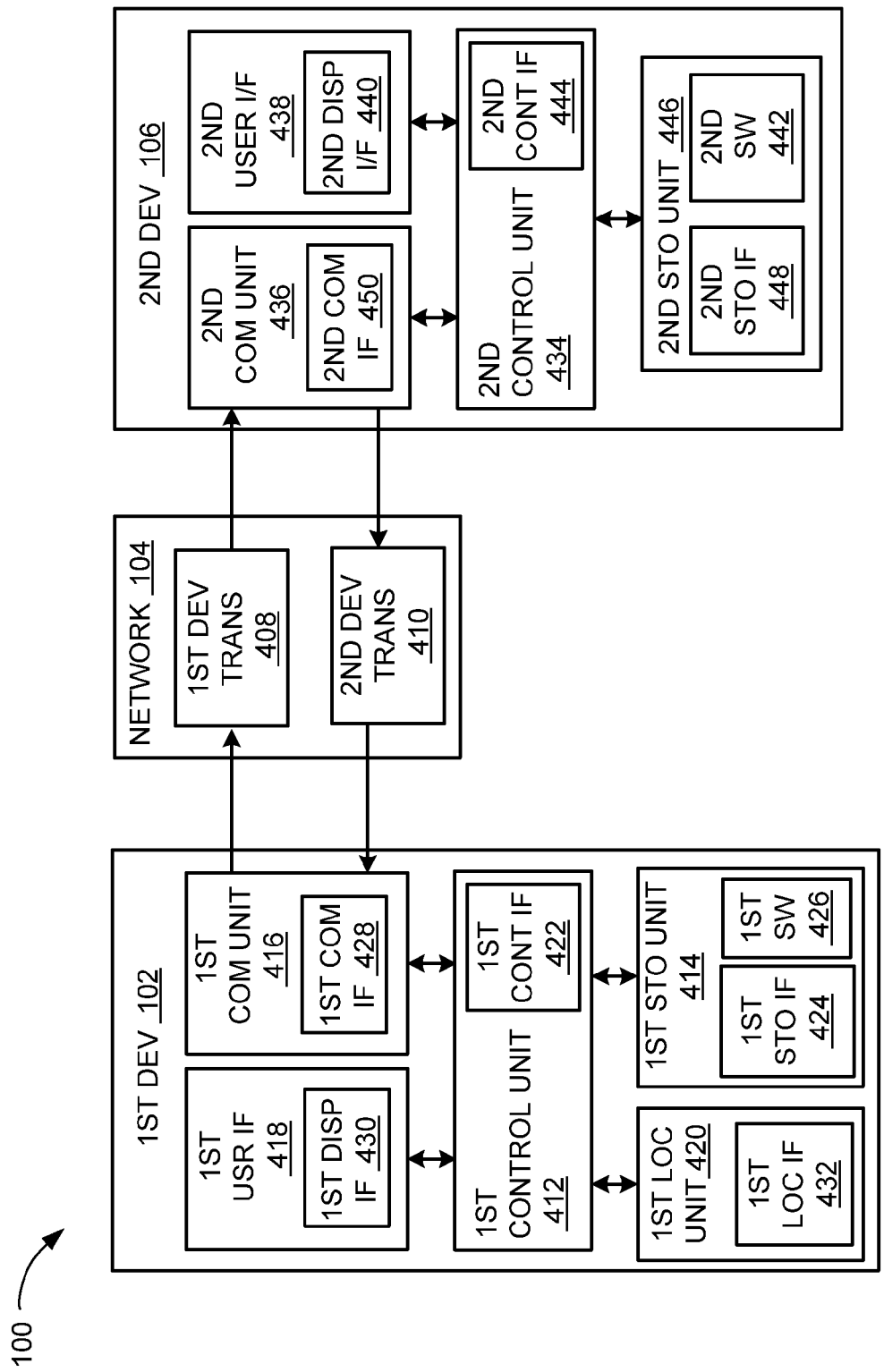
FIG. 4 is an exemplary block diagram of the navigation system.

Referring now to FIG. 4, therein is shown an exemplary block diagram of the navigation system 100. The navigation system 100 can include the first device 102, the network 104, and the second device 106. The first device 102 can send information in a first device transmission 408 over the network 104 to the second device 106. The second device 106 can send information in a second device transmission 410 over the network 104 to the first device 102.

For illustrative purposes, the navigation system 100 is shown with the first device 102 as a client device, although it is understood that the navigation system 100 can have the first device 102 as a different type of device. For example, the first device 102 can be a server having a display interface.

Also for illustrative purposes, the navigation system 100 is shown with the second device 106 as a server, although it is understood that the navigation system 100 can have the second device 106 as a different type of device. For example, the second device 106 can be a client device.

For brevity of description in this embodiment of the present invention, the first device 102 will be described as a client device and the second device 106 will be described as a server device. The embodiment of the present invention is not limited to this selection for the type of devices. The selection is an example of an embodiment of the present invention.

The first device 102 can include a first control unit 412, a first storage unit 414, a first communication unit 416, and a first user interface 418, and a first location unit 420. The first control unit 412 can include a first control interface 422. The first control unit 412 can execute a first software 426 to provide the intelligence of the navigation system 100.

The first control unit 412 can be implemented in a number of different manners. For example, the first control unit 412 can be a processor, an application specific integrated circuit (ASIC) an embedded processor, a microprocessor, a hardware control logic, a hardware finite state machine (FSM), a digital signal processor (DSP), or a combination thereof. The first control interface 422 can be used for communication between the first control unit 412 and other functional units in the first device 102. The first control interface 422 can also be used for communication that is external to the first device 102.

The first control interface 422 can receive information from the other functional units or from external sources, or can transmit information to the other functional units or to external destinations. The external sources and the external destinations refer to sources and destinations external to the first device 102.

The first control interface 422 can be implemented in different ways and can include different implementations depending on which functional units or external units are being interfaced with the first control interface 422. For example, the first control interface 422 can be implemented with a pressure sensor, an inertial sensor, a microelectromechanical system (MEMS), optical circuitry, waveguides, wireless circuitry, wireline circuitry, or a combination thereof.

The first storage unit 414 can store the first software 426. The first storage unit 414 can also store the relevant information, such as data representing incoming images, data representing previously presented image, sound files, or a combination thereof.

The first storage unit 414 can be a volatile memory, a nonvolatile memory, an internal memory, an external memory, or a combination thereof. For example, the first storage unit 414 can be a nonvolatile storage such as non-volatile random access memory (NVRAM), Flash memory, disk storage, or a volatile storage such as static random access memory (SRAM).

The first storage unit 414 can include a first storage interface 424. The first storage interface 424 can be used for communication between the first storage unit 414 and other functional units in the first device 102. The first storage interface 424 can also be used for communication that is external to the first device 102.

The first storage interface 424 can receive information from the other functional units or from external sources, or can transmit information to the other functional units or to external destinations. The external sources and the external destinations refer to sources and destinations external to the first device 102.

The first storage interface 424 can include different implementations depending on which functional units or external units are being interfaced with the first storage unit 414. The first storage interface 424 can be implemented with technologies and techniques similar to the implementation of the first control interface 422.

The first communication unit 416 can enable external communication to and from the first device 102. For example, the first communication unit 416 can permit the first device 102 to communicate with the second device 106 of FIG. 1, an attachment, such as a peripheral device or a desktop computer, and the network 104.

The first communication unit 416 can also function as a communication hub allowing the first device 102 to function as part of the network 104 and not limited to be an end point or terminal unit to the network 104. The first communication unit 416 can include active and passive components, such as microelectronics or an antenna, for interaction with the network 104.

The first communication unit 416 can include a first communication interface 428. The first communication interface 428 can be used for communication between the first communication unit 416 and other functional units in the first device 102. The first communication interface 428 can receive information from the other functional units or can transmit information to the other functional units.

The first communication interface 428 can include different implementations depending on which functional units are being interfaced with the first communication unit 416. The first communication interface 428 can be implemented with technologies and techniques similar to the implementation of the first control interface 422.

The first user interface 418 allows a user (not shown) to interface and interact with the first device 102. The first user interface 418 can include an input device and an output device. Examples of the input device of the first user interface 418 can include a keypad, a touchpad, soft-keys, a keyboard, a microphone, an infrared sensor for receiving remote signals, or any combination thereof to provide data and communication inputs.

The first user interface 418 can include a first display interface 430. The first display interface 430 can include an output device. The first display interface 430 can include a display, a projector, a video screen, a speaker, or any combination thereof.

The first control unit 412 can operate the first user interface 418 to display information generated by the navigation system 100. The first control unit 412 can also execute the first software 426 for the other functions of the navigation system 100, including receiving location information from the first location unit 420. The first control unit 412 can further execute the first software 426 for interaction with the network 104 via the first communication unit 416.

The first location unit 420 can generate location information, current heading, current acceleration, and current speed of the first device 102, as examples. The first location unit 420 can be implemented in many ways. For example, the first location unit 420 can function as at least a part of the global positioning system, an inertial navigation system, a cellular-tower location system, a pressure location system, or any combination thereof. Also, for example, the first location unit 420 can utilize components such as an accelerometer or GPS receiver.

The first location unit 420 can include a first location interface 432. The first location interface 432 can be used for communication between the first location unit 420 and other functional units in the first device 102. The first location interface 432 can also be used for communication external to the first device 102.

The first location interface 432 can receive information from the other functional units or from external sources, or can transmit information to the other functional units or to external destinations. The external sources and the external destinations refer to sources and destinations external to the first device 102.

The first location interface 432 can include different implementations depending on which functional units or external units are being interfaced with the first location unit 420. The first location interface 432 can be implemented with technologies and techniques similar to the implementation of the first control unit 412.

The second device 106 can be optimized for implementing an embodiment of the present invention in a multiple device embodiment with the first device 102. The second device 106 can provide the additional or higher performance processing power compared to the first device 102. The second device 106 can include a second control unit 434, a second communication unit 436, a second user interface 438, and a second storage unit 446.

The second user interface 438 allows a user (not shown) to interface and interact with the second device 106. The second user interface 438 can include an input device and an output device. Examples of the input device of the second user interface 438 can include a keypad, a touchpad, soft-keys, a keyboard, a microphone, or any combination thereof to provide data and communication inputs. Examples of the output device of the second user interface 438 can include a second display interface 440. The second display interface 440 can include a display, a projector, a video screen, a speaker, or any combination thereof.

The second control unit 434 can execute a second software 442 to provide the intelligence of the second device 106 of the navigation system 100. The second software 442 can operate in conjunction with the first software 426. The second control unit 434 can provide additional performance compared to the first control unit 412.

The second control unit 434 can operate the second user interface 438 to display information. The second control unit 434 can also execute the second software 442 for the other functions of the navigation system 100, including operating the second communication unit 436 to communicate with the first device 102 over the network 104.

The second control unit 434 can be implemented in a number of different manners. For example, the second control unit 434 can be a processor, an embedded processor, a microprocessor, hardware control logic, a hardware finite state machine (FSM), a digital signal processor (DSP), or a combination thereof.

The second control unit 434 can include a second control interface 444. The second control interface 444 can be used for communication between the second control unit 434 and other functional units in the second device 106. The second control interface 444 can also be used for communication that is external to the second device 106.

The second control interface 444 can receive information from the other functional units or from external sources, or can transmit information to the other functional units or to external destinations. The external sources and the external destinations refer to sources and destinations external to the second device 106.

The second control interface 444 can be implemented in different ways and can include different implementations depending on which functional units or external units are being interfaced with the second control interface 444. For example, the second control interface 444 can be implemented with a pressure sensor, an inertial sensor, a microelectromechanical system (MEMS), optical circuitry, waveguides, wireless circuitry, wireline circuitry, or a combination thereof.

A second storage unit 446 can store the second software 442. The second storage unit 446 can also store the information such as data representing incoming images, data representing previously presented image, sound files, or a combination thereof. The second storage unit 446 can be sized to provide the additional storage capacity to supplement the first storage unit 414.

For illustrative purposes, the second storage unit 446 is shown as a single element, although it is understood that the second storage unit 446 can be a distribution of storage elements. Also for illustrative purposes, the navigation system 100 is shown with the second storage unit 446 as a single hierarchy storage system, although it is understood that the navigation system 100 can have the second storage unit 446 in a different configuration. For example, the second storage unit 446 can be formed with different storage technologies forming a memory hierarchal system including different levels of caching, main memory, rotating media, or off-line storage.

The second storage unit 446 can be a volatile memory, a nonvolatile memory, an internal memory, an external memory, or a combination thereof. For example, the second storage unit 446 can be a nonvolatile storage such as non-volatile random access memory (NVRAM), Flash memory, disk storage, or a volatile storage such as static random access memory (SRAM).

The second storage unit 446 can include a second storage interface 448. The second storage interface 448 can be used for communication between the second storage unit 446 and other functional units in the second device 106. The second storage interface 448 can also be used for communication that is external to the second device 106.

The second storage interface 448 can receive information from the other functional units or from external sources, or can transmit information to the other functional units or to external destinations. The external sources and the external destinations refer to sources and destinations external to the second device 106.

The second storage interface 448 can include different implementations depending on which functional units or external units are being interfaced with the second storage unit 446. The second storage interface 448 can be implemented with technologies and techniques similar to the implementation of the second control interface 444.

The second communication unit 436 can enable external communication to and from the second device 106. For example, the second communication unit 436 can permit the second device 106 to communicate with the first device 102 over the network 104.

The second communication unit 436 can also function as a communication hub allowing the second device 106 to function as part of the network 104 and not limited to be an end point or terminal unit to the network 104. The second communication unit 436 can include active and passive components, such as microelectronics or an antenna, for interaction with the network 104.

The second communication unit 436 can include a second communication interface 450. The second communication interface 450 can be used for communication between the second communication unit 436 and other functional units in the second device 106. The second communication interface 450 can receive information from the other functional units or can transmit information to the other functional units.

The second communication interface 450 can include different implementations depending on which functional units are being interfaced with the second communication unit 436. The second communication interface 450 can be implemented with technologies and techniques similar to the implementation of the second control interface 444.

The first communication unit 416 can couple with the network 104 to send information to the second device 106 in the first device transmission 408. The second device 106 can receive information in the second communication unit 436 from the first device transmission 408 of the network 104.

The second communication unit 436 can couple with the network 104 to send information to the first device 102 in the second device transmission 410. The first device 102 can receive information in the first communication unit 416 from the second device transmission 410 of the network 104. The navigation system 100 can be executed by the first control unit 412, the second control unit 434, or a combination thereof. For illustrative purposes, the second device 106 is shown with the partition having the second user interface 438, the second storage unit 446, the second control unit 434, and the second communication unit 436, although it is understood that the second device 106 can have a different partition. For example, the second software 442 can be partitioned differently such that some or all of its function can be in the second control unit 434 and the second communication unit 436. Also, the second device 106 can include other functional units not shown in FIG. 4 for clarity.

The functional units in the first device 102 can work individually and independently of the other functional units. The first device 102 can work individually and independently from the second device 106 and the network 104.

The functional units in the second device 106 can work individually and independently of the other functional units. The second device 106 can work individually and independently from the first device 102 and the network 104.

The functional units described above can be implemented in hardware. For example, one or more of the functional units can be implemented using the a gate, circuitry, a processor, a computer, integrated circuit, integrated circuit cores, a pressure sensor, an inertial sensor, a microelectromechanical system (MEMS), a passive device, a physical non-transitory memory medium having instructions for performing the software function, a portion therein, or a combination thereof.

For illustrative purposes, the navigation system 100 is described by operation of the first device 102 and the second device 106. It is understood that the first device 102 and the second device 106 can operate any of the modules and functions of the navigation system 100.

Figure 5:
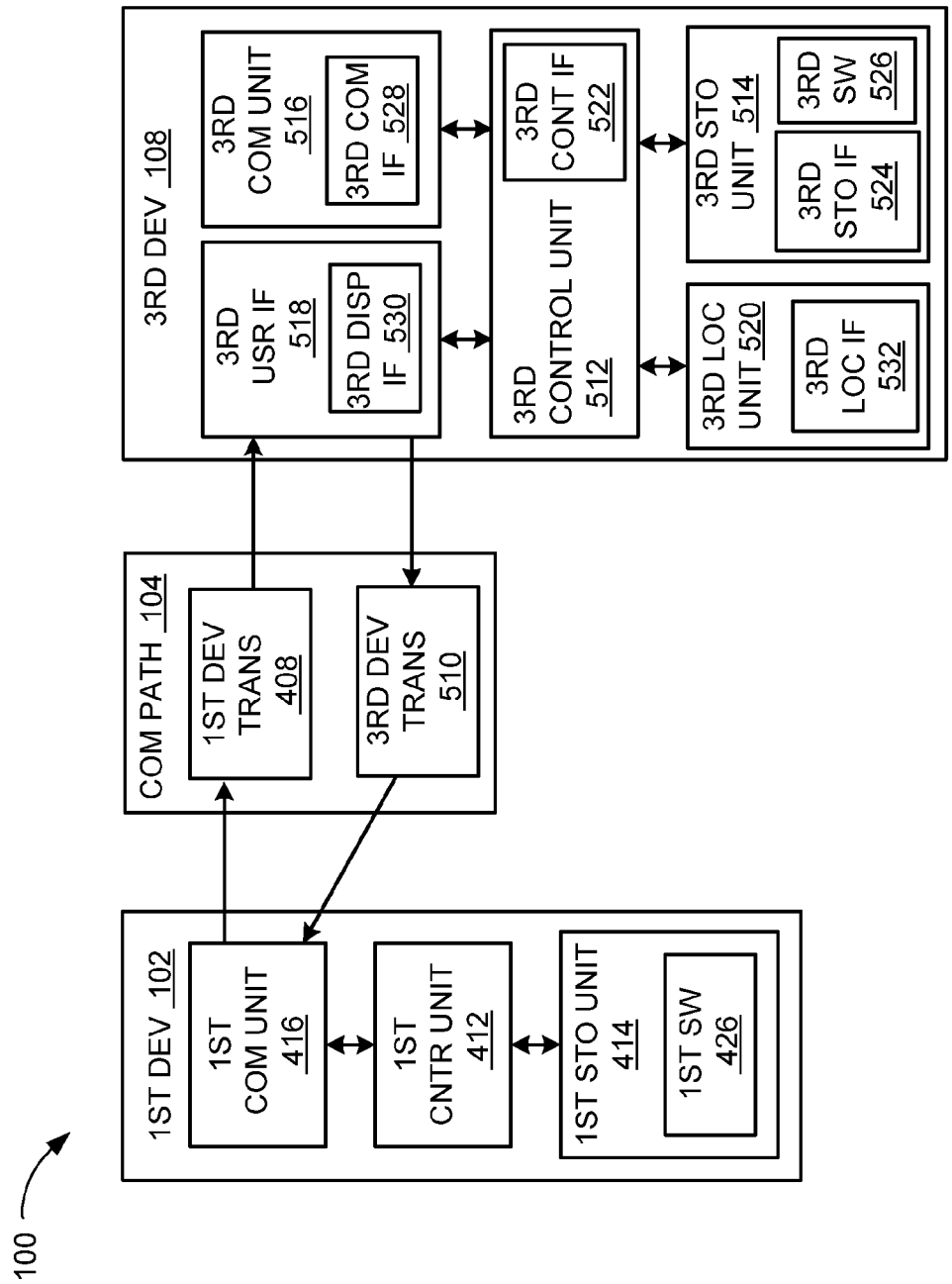
FIG. 5 is a further exemplary block diagram of the navigation system.

Referring now to FIG. 5, therein is shown a further exemplary block diagram of the navigation system 100. Along with the first device 102 and the second device 106 of FIG. 4, the navigation system 100 can include the third device 108. The first device 102 can send information in the first device transmission 408 over the communication path 104 to the third device 108. The third device 108 can send information in a third device transmission 510 over the communication path 104 to the first device 102, the second device 106, or a combination thereof.

For illustrative purposes, the navigation system 100 is shown with the third device 108 as a client device, although it is understood that the navigation system 100 can have the third device 108 as a different type of device. For example, the third device 108 can be a server.

Also for illustrative purposes, the navigation system 100 is shown with the first device 102 communicating with the third device 108. However, it is understood that the second device 106, the fourth device 110, or a combination thereof can also communicate with the third device 108 in a similar manner as the communication between the first device 102 and the second device 106.

For brevity of description in this embodiment of the present invention, the third device 108 will be described as a client device. The embodiment of the present invention is not limited to this selection for the type of devices. The selection is an example of an embodiment of the present invention.

The third device 108 can be optimized for implementing an embodiment of the present invention in a multiple device or multiple user embodiments with the first device 102. The third device 108 can provide the additional or specific functions compared to the first device 102, the second device 106, or a combination thereof. The third device 108 can further be a device owned or used by a separate user different from the user of the first device 102.

The third device 108 can include a third control unit 512, a third storage unit 514, a third communication unit 516, a third user interface 518, and a third location unit 520. The third control unit 512 can include a third control interface 522. The third control unit 512 can execute a third software 526 to provide the intelligence of the navigation system 100.

The third control unit 512 can be implemented in a number of different manners. For example, the third control unit 512 can be a processor, an application specific integrated circuit (ASIC) an embedded processor, a microprocessor, a hardware control logic, a hardware finite state machine (FSM), a digital signal processor (DSP), or a combination thereof. The third control interface 522 can be used for communication between the third control unit 512 and other functional units in the third device 108. The third control interface 522 can also be used for communication that is external to the third device 108.

The third control interface 522 can receive information from the other functional units or from external sources, or can transmit information to the other functional units or to external destinations. The external sources and the external destinations refer to sources and destinations external to the third device 108.

The third control interface 522 can be implemented in different ways and can include different implementations depending on which functional units or external units are being interfaced with the third control interface 522. For example, the third control interface 522 can be implemented with a pressure sensor, an inertial sensor, a microelectromechanical system (MEMS), optical circuitry, waveguides, wireless circuitry, wireline circuitry, or a combination thereof.

The third storage unit 514 can store the third software 526. The third storage unit 514 can also store the relevant information, such as data representing incoming images, data representing previously presented image, sound files, or a combination thereof.

The third storage unit 514 can be a volatile memory, a nonvolatile memory, an internal memory, an external memory, or a combination thereof. For example, the third storage unit 514 can be a nonvolatile storage such as non-volatile random access memory (NVRAM), Flash memory, disk storage, or a volatile storage such as static random access memory (SRAM). Also for example, the third storage unit 514 can be distribution of storage elements, multiple hierarchy storage system including different levels of caching, main memory, rotating media, or off-line storage, or a combination thereof.

The third storage unit 514 can include a third storage interface 524. The third storage interface 524 can be used for communication between the third storage unit 514 and other functional units in the third device 108. The third storage interface 524 can also be used for communication that is external to the third device 108.

The third storage interface 524 can receive information from the other functional units or from external sources, or can transmit information to the other functional units or to external destinations. The external sources and the external destinations refer to sources and destinations external to the third device 108.

The third storage interface 524 can include different implementations depending on which functional units or external units are being interfaced with the third storage unit 514. The third storage interface 524 can be implemented with technologies and techniques similar to the implementation of the third control interface 522.

The third communication unit 516 can enable external communication to and from the third device 108. For example, the third communication unit 516 can permit the third device 108 to communicate with the second device 106, the first device 102, the fourth device 110, a different device, an attachment, such as a peripheral device or a desktop computer, the communication path 104, or a combination thereof.

The third communication unit 516 can also function as a communication hub allowing the third device 108 to function as part of the communication path 104 and not limited to be an end point or terminal unit to the communication path 104. The third communication unit 516 can include active and passive components, such as microelectronics or an antenna, for interaction with the communication path 104.

The third communication unit 516 can include a baseband device or component, a modem, a digital signal processor, or a combination thereof for transmitting, formatting, receiving, detecting, decoding, further processing, or a combination thereof for communication signals. The third communication unit 516 can include one or more portions for processing the voltages, the currents, the digital information, or a combination thereof, such as an analog-to-digital converter, a digital-to-analog converter, a filter, an amplifier, a processor-type circuitry, or a combination thereof. The third communication unit 516 can further include one or more portions for storing information, such as cache or RAM memory, registers, or a combination thereof.

The third communication unit 516 can include a third communication interface 528. The third communication interface 528 can be used for communication between the third communication unit 516 and other functional units in the third device 108. The third communication interface 528 can receive information from the other functional units or can transmit information to the other functional units.

The third communication interface 528 can include different implementations depending on which functional units are being interfaced with the third communication unit 516. The third communication interface 528 can be implemented with technologies and techniques similar to the implementation of the third control interface 522.

The third user interface 518 allows a user (not shown) to interface and interact with the third device 108. The third user interface 518 can include an input device and an output device. Examples of the input device of the third user interface 518 can include a keypad, a touchpad, soft-keys, a keyboard, a microphone, an infrared sensor for receiving remote signals, or any combination thereof to provide data and communication inputs.

The third user interface 518 can include a third display interface 530. The third display interface 530 can include an output device. The third display interface 530 can include a display, a projector, a video screen, a speaker, or any combination thereof.

The third control unit 512 can operate the third user interface 518 to display information generated by the navigation system 100. The third control unit 512 can also execute the third software 526 for the other functions of the navigation system 100, including receiving location information from the third location unit 520. The third control unit 512 can further execute the third software 526 for interaction with the communication path 104 via the third communication unit 516.

The third location unit 520 can generate location information, current heading, current acceleration, and current speed of the third device 108, as examples. The third location unit 520 can be implemented in many ways. For example, the third location unit 520 can function as at least a part of the global positioning system, an inertial computing system, a cellular-tower location system, a pressure location system, or any combination thereof. Also, for example, the third location unit 520 can utilize components such as an accelerometer or GPS receiver.

The third location unit 520 can include a third location interface 532. The third location interface 532 can be used for communication between the third location unit 520 and other functional units in the third device 108. The third location interface 532 can also be used for communication external to the third device 108.

The third location interface 532 can receive information from the other functional units or from external sources, or can transmit information to the other functional units or to external destinations. The external sources and the external destinations refer to sources and destinations external to the third device 108.

The third location interface 532 can include different implementations depending on which functional units or external units are being interfaced with the third location unit 520. The third location interface 532 can be implemented with technologies and techniques similar to the implementation of the third control unit 512.

For illustrative purposes, the third device 108 is shown with the partition having the third user interface 518, the third storage unit 514, the third control unit 512, and the third communication unit 516, although it is understood that the third device 108 can have a different partition. For example, the third software 526 can be partitioned differently such that some or all of its function can be in the third control unit 512 and the third communication unit 516. Also, the third device 108 can include other functional units not shown in FIG. 5 for clarity.

The functional units in the third device 108 can work individually and independently of the other functional units. The third device 108 can work individually and independently from the first device 102, the second device 106, the fourth device 110, and the communication path 104.

For illustrative purposes, the navigation system 100 is described by operation of the first device 102 and the third device 108. It is understood that the first device 102, the second device 106, the fourth device 110, and the third device 108 can operate any of the modules and functions of the navigation system 100.

Figure 6:
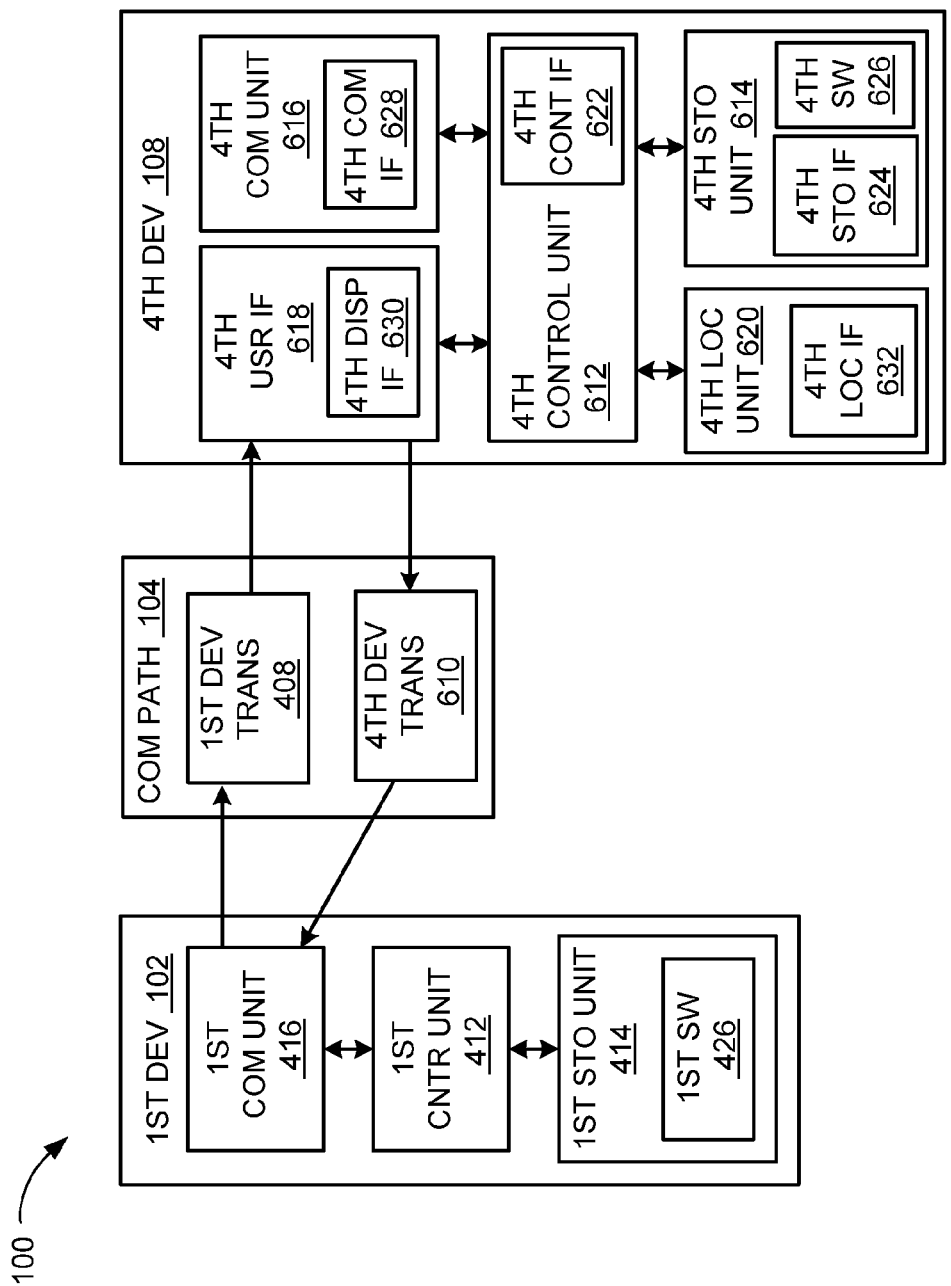
FIG. 6 is a further exemplary block diagram of the navigation system.

Referring now to FIG. 6, therein is shown a further exemplary block diagram of the computing system 100. Along with the first device 102, and the second device 106 of FIG. 4, the third device 108 of FIG. 5, the computing system 100 can include the fourth device 110. The first device 102 can send information in the first device transmission 408 over the communication path 104 to the fourth device 110. The fourth device 110 can send information in a fourth device transmission 610 over the communication path 104 to the first device 102, the second device 106, or a combination thereof.

For illustrative purposes, the computing system 100 is shown with the fourth device 110 as a client device, although it is understood that the computing system 100 can have the fourth device 110 as a different type of device. For example, the fourth device 110 can be a server.

Also for illustrative purposes, the computing system 100 is shown with the first device 102 communicating with the fourth device 110. However, it is understood that the second device 106, the third device 108, or a combination thereof can also communicate with the fourth device 110 in a similar manner as the communication between the first device 102 and the second device 106.

For brevity of description in this embodiment of the present invention, the fourth device 110 will be described as a client device. The embodiment of the present invention is not limited to this selection for the type of devices. The selection is an example of an embodiment of the present invention.

The fourth device 110 can be optimized for implementing an embodiment of the present invention in a multiple device or multiple user embodiments with the first device 102. The fourth device 110 can provide the additional or specific functions compared to the first device 102, the second device 106, or a combination thereof. The fourth device 110 can further be a device owned or used by a separate user different from the user of the first device 102.

The fourth device 110 can include a fourth control unit 612, a fourth storage unit 614, a fourth communication unit 616, a fourth user interface 618, and a fourth location unit 620. The fourth control unit 612 can include a fourth control interface 622. The fourth control unit 612 can execute a fourth software 626 to provide the intelligence of the computing system 100.

The fourth control unit 612 can be implemented in a number of different manners. For example, the fourth control unit 612 can be a processor, an application specific integrated circuit (ASIC) an embedded processor, a microprocessor, a hardware control logic, a hardware finite state machine (FSM), a digital signal processor (DSP), or a combination thereof. The fourth control interface 622 can be used for communication between the fourth control unit 612 and other functional units in the fourth device 110. The fourth control interface 622 can also be used for communication that is external to the fourth device 110.

The fourth control interface 622 can receive information from the other functional units or from external sources, or can transmit information to the other functional units or to external destinations. The external sources and the external destinations refer to sources and destinations external to the fourth device 110.

The fourth control interface 622 can be implemented in different ways and can include different implementations depending on which functional units or external units are being interfaced with the fourth control interface 622. For example, the fourth control interface 622 can be implemented with a pressure sensor, an inertial sensor, a microelectromechanical system (MEMS), optical circuitry, waveguides, wireless circuitry, wireline circuitry, or a combination thereof.

The fourth storage unit 614 can store the fourth software 626. The fourth storage unit 614 can also store the relevant information, such as data representing incoming images, data representing previously presented image, sound files, or a combination thereof.

The fourth storage unit 614 can be a volatile memory, a nonvolatile memory, an internal memory, an external memory, or a combination thereof. For example, the fourth storage unit 614 can be a nonvolatile storage such as non-volatile random access memory (NVRAM), Flash memory, disk storage, or a volatile storage such as static random access memory (SRAM). Also for example, the fourth storage unit 614 can be distribution of storage elements, multiple hierarchy storage system including different levels of caching, main memory, rotating media, or off-line storage, or a combination thereof.

The fourth storage unit 614 can include a fourth storage interface 624. The fourth storage interface 624 can be used for communication between the fourth storage unit 614 and other functional units in the fourth device 110. The fourth storage interface 624 can also be used for communication that is external to the fourth device 110.

The fourth storage interface 624 can receive information from the other functional units or from external sources, or can transmit information to the other functional units or to external destinations. The external sources and the external destinations refer to sources and destinations external to the fourth device 110.

The fourth storage interface 624 can include different implementations depending on which functional units or external units are being interfaced with the fourth storage unit 614. The fourth storage interface 624 can be implemented with technologies and techniques similar to the implementation of the fourth control interface 622.

The fourth communication unit 616 can enable external communication to and from the fourth device 110. For example, the fourth communication unit 616 can permit the fourth device 110 to communicate with the second device 106, the first device 102, the third device 108, a different device, an attachment, such as a peripheral device or a desktop computer, the communication path 104, or a combination thereof.

The fourth communication unit 616 can also function as a communication hub allowing the fourth device 110 to function as part of the communication path 104 and not limited to be an end point or terminal unit to the communication path 104. The fourth communication unit 616 can include active and passive components, such as microelectronics or an antenna, for interaction with the communication path 104.

The fourth communication unit 616 can include a baseband device or component, a modem, a digital signal processor, or a combination thereof for transmitting, formatting, receiving, detecting, decoding, further processing, or a combination thereof for communication signals. The fourth communication unit 616 can include one or more portions for processing the voltages, the currents, the digital information, or a combination thereof, such as an analog-to-digital converter, a digital-to-analog converter, a filter, an amplifier, a processor-type circuitry, or a combination thereof. The fourth communication unit 616 can further include one or more portions for storing information, such as cache or RAM memory, registers, or a combination thereof.

The fourth communication unit 616 can include the vehicle link mechanism 220 of FIG. 2, such as a port or a wireless device, for connecting to other devices. The fourth communication unit 616 can include or be connected to other devices, such as sensors. The fourth communication unit 616 can include or be connected to the vehicle sensor 206 of FIG. 2.

The fourth communication unit 616 can include a fourth communication interface 628. The fourth communication interface 628 can be used for communication between the fourth communication unit 616 and other functional units in the fourth device 110. The fourth communication interface 628 can receive information from the other functional units or can transmit information to the other functional units.

The fourth communication interface 628 can include different implementations depending on which functional units are being interfaced with the fourth communication unit 616. The fourth communication interface 628 can be implemented with technologies and techniques similar to the implementation of the fourth control interface 622.

The fourth user interface 618 allows a user (not shown) to interface and interact with the fourth device 110. The fourth user interface 618 can include an input device and an output device. Examples of the input device of the fourth user interface 618 can include a keypad, a touchpad, soft-keys, a keyboard, a microphone, an infrared sensor for receiving remote signals, or any combination thereof to provide data and communication inputs.

The fourth user interface 618 can include a fourth display interface 630. The fourth display interface 630 can include an output device. The fourth display interface 630 can include a display, a projector, a video screen, a speaker, or any combination thereof.

The fourth control unit 612 can operate the fourth user interface 618 to display information generated by the computing system 100. The fourth control unit 612 can also execute the fourth software 626 for the other functions of the computing system 100, including receiving location information from the fourth location unit 620. The fourth control unit 612 can further execute the fourth software 626 for interaction with the communication path 104 via the fourth communication unit 616.

The fourth location unit 620 can generate location information, current heading, current acceleration, and current speed of the fourth device 110, as examples. The fourth location unit 620 can be implemented in many ways. For example, the fourth location unit 620 can function as at least a part of the global positioning system, an inertial computing system, a cellular-tower location system, a pressure location system, or any combination thereof. Also, for example, the fourth location unit 620 can utilize components such as an accelerometer or GPS receiver.

The fourth location unit 620 can include a fourth location interface 632. The fourth location interface 632 can be used for communication between the fourth location unit 620 and other functional units in the fourth device 110. The fourth location interface 632 can also be used for communication external to the fourth device 110.

The fourth location interface 632 can receive information from the other functional units or from external sources, or can transmit information to the other functional units or to external destinations. The external sources and the external destinations refer to sources and destinations external to the fourth device 110.

The fourth location interface 632 can include different implementations depending on which functional units or external units are being interfaced with the fourth location unit 620. The fourth location interface 632 can be implemented with technologies and techniques similar to the implementation of the fourth control unit 612.

For illustrative purposes, the fourth device 110 is shown with the partition having the fourth user interface 618, the fourth storage unit 614, the fourth control unit 612, and the fourth communication unit 616, although it is understood that the fourth device 110 can have a different partition. For example, the fourth software 626 can be partitioned differently such that some or all of its function can be in the fourth control unit 612 and the fourth communication unit 616. Also, the fourth device 110 can include other functional units not shown in FIG. 6 for clarity.

The functional units in the fourth device 110 can work individually and independently of the other functional units. The fourth device 110 can work individually and independently from the first device 102, the second device 106, the third device 108, and the communication path 104.

For illustrative purposes, the computing system 100 is described by operation of the first device 102 and the fourth device 110. It is understood that the first device 102, the second device 106, the third device 108, and the fourth device 110 can operate any of the modules and functions of the computing system 100.

Figure 7:
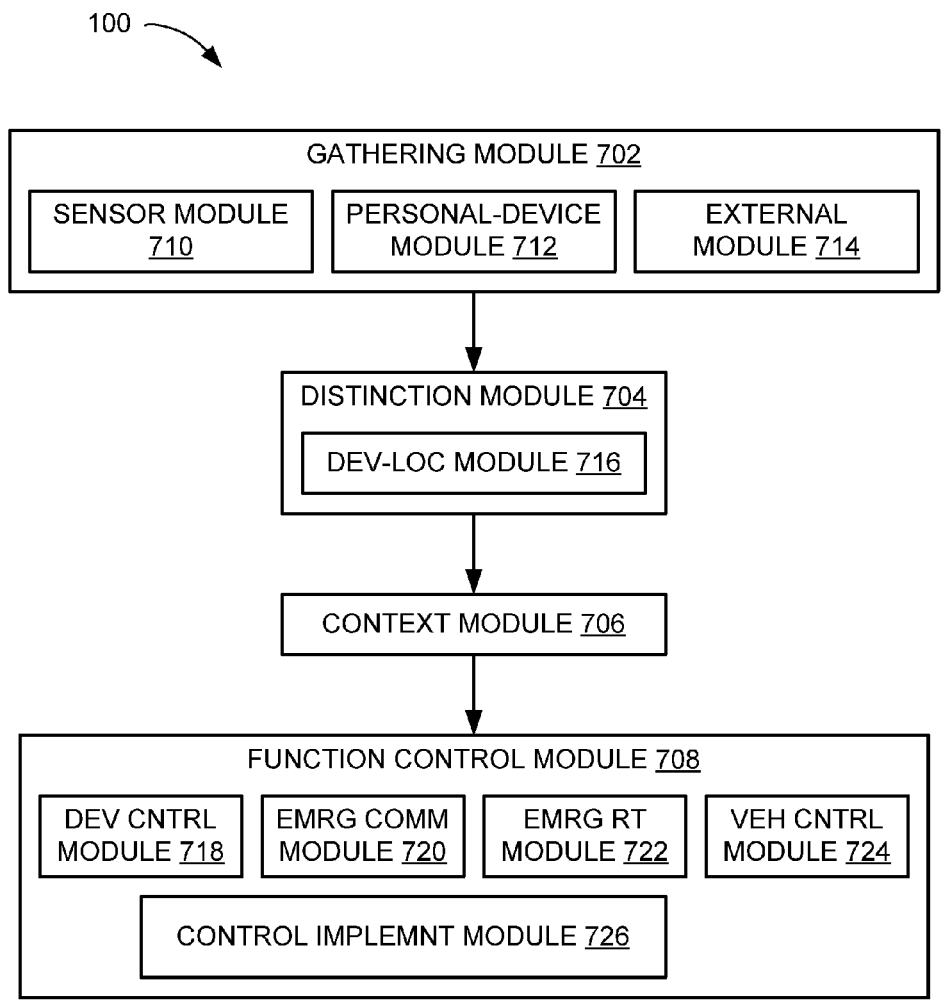
FIG. 7 is a control flow of the navigation system.

Referring now to FIG. 7, therein is shown a control flow of the navigation system 100. The navigation system 100 can include a gathering module 702, a distinction module 704, a context module 706, a function control module 708, or a combination thereof.

The gathering module 702 can be coupled to the distinction module 704, the context module 706, or a combination thereof using wired or wireless connections, by having an output of one module as an input of the other module, by having operations of one module influence operation of the other module, or a combination thereof. Similarly, the distinction module 704, the context module 706, or a combination thereof can be coupled to the function control module 708, which can be further coupled to the gathering module 702.

The gathering module 702 is for determining information associated with the vehicle 202 of FIG. 2. For example, the gathering module 702 can identify the cabin outline 204 of FIG. 2 for representing the vehicle 202 or a portion therein, such as a portion having designated control interface, a passenger designated portion, or a combination thereof. The gathering module 702 can identify the cabin outline 204 based on the first device 102 of FIG. 1, the second device 106 of FIG. 1, the third device 108 of FIG. 1, the fourth device 110 of FIG. 1, the vehicle 202, the reference source 218 of FIG. 2 therein, or a combination thereof.

As a more specific example, the gathering module 702 can identify the cabin outline 204 based on outlining information, such as using visual information or wave reflection information, for utilizing the first device 102, the third device 108, the reference source 218, or a combination thereof as a source or a receiver. Also as a more specific example, the gathering module 702 can identify the cabin outline 204 based on the outlining information, such as a set of distances and angles relative to a reference point, shapes, coordinates, or a combination thereof, as predetermined and stored in the second device 106, the fourth device 110, or a combination thereof. The gathering module 702 can further use the first device 102, the third device 108, or a combination thereof to access the cabin outline 204 predetermined and stored in the second device 106, the fourth device 110, or a combination thereof.

Also for example, the gathering module 702 can determine, identify, or communicate the vehicle link status 222 of FIG. 2, the vehicle-source data 224 of FIG. 2, information from the vehicle sensor 206 of FIG. 2, the device profile 232 of FIG. 2, the user profile 236 of FIG. 2, the contextual input 238 of FIG. 2, other information internal or external to the navigation system 100 or the vehicle 202, or a combination thereof.

The gathering module 702 can include a sensor module 710, a personal-device module 712, an external module 714, or a combination thereof. The gathering module 702 can determine, identify, or communicate information associated with the vehicle 202 using the sensor module 710, the personal-device module 712, the external module 714, or a combination thereof.

The sensor module 710 is for determine, identify, or communicate information associated with the vehicle sensor 206. The sensor module 710 can use the first user interface 418 of FIG. 4, the second user interface 438 of FIG. 4, the third user interface 518 of FIG. 5, the fourth user interface 618 of FIG. 6, the first communication unit 416 of FIG. 4, the second communication unit 436 of FIG. 4, the third communication unit 516 of FIG. 5, the fourth communication unit 616 of FIG. 6, or a combination thereof to determine, identify, or communicate information associated with the vehicle sensor 206.

The sensor module 710 can determine the vehicle-source data 224 by communicating, such as by transmitting or receiving, the information between devices, such as between first device 102, the second device 106, the third device 108, the fourth device 110, the vehicle 202 or a combination thereof. The sensor module 710 can determine or identify the vehicle-source data 224 from the vehicle 202. For example, the sensor module 710 can communicate the movement data 226 of FIG. 2, the cabin data 228 of FIG. 2, or a combination thereof between devices of the navigation system 100.

Also for example, the sensor module 710 can receive a status signal from the seat sensor 212 of FIG. 2 or a data signal from the functional sensor 216 of FIG. 2. Also for example, the sensor module 710 can communicate using the vehicle link mechanism 220 of FIG. 2.

The sensor module 710 can further identify or determine relevant data from the vehicle sensor 206. The sensor module 710 can identify the relevant data by determining a processing result based on data from the vehicle sensor 206. For example, the sensor module 710 can identify or determine a user's mood or emotion from an image from the cabin camera 210 of FIG. 2. Also for example, the sensor module 710 can identify or determine a user's health condition, such as heart rate per minute or blood pressure, based on readings from the biosensor 214 of FIG. 2.

Also for example, the sensor module 710 can generate the vehicle link status 222 based on a connection with a device through the vehicle link mechanism 220. The sensor module 710 can generate the vehicle link status 222 for representing an interaction between the first device 102, the second device 106, the third device 108, the fourth device 110, or a combination thereof and the vehicle 202. The sensor module 710 can generate the vehicle link status 222 based on a mechanical switch or trigger, completing a circuit based on connecting through the vehicle link mechanism 220, a signal or data communicated through the vehicle link mechanism 220, or a combination thereof.

The personal-device module 712 is for determining information regarding a device or the user of the device. The personal-device module 712 can determine the device profile 232 corresponding to the first device 102, the second device 106, the third device 108, the fourth device 110, or a combination thereof. The personal-device module 712 can determine the user profile 236 corresponding to the first user 112 of FIG. 1, the second user 114 of FIG. 1, or a combination thereof.

The personal-device module 712 can determine information associated with identification, detail, other information associated or correlated with the first device 102, the second device 106, the third device 108, the fourth device 110, the first user 112, the second user 114, or a combination thereof. The personal-device module 712 can determine the information based on various information.

For example, the personal-device module 712 can determine the information by searching available or accessible information, determining correlation or association with the user or the device, or a combination thereof. As a more specific example, the personal-device module 712 can search membership profile, registration information, social media, or a combination thereof for information corresponding to the first device 102, the second device 106, the third device 108, the fourth device 110, the first user 112, the second user 114, or a combination thereof.

Also for example, the personal-device module 712 can determine the information by receiving information from the user or a device. As a more specific example, the personal-device module 712 can use the first user interface 418, the second user interface 438, the third user interface 518, the fourth user interface 618, or a combination thereof to receive information from the first user 112, the second user 114, or a combination thereof. Also as a more specific example, the personal-device module 712 can use the first communication unit 416, the second communication unit 436, the third communication unit 516, the fourth communication unit 616, or a combination thereof to search or communicate information between devices, such as a database or a website.

The personal-device module 712 can further determine the information by determining the user profile 236, the device profile 232, or a combination thereof. The personal-device module 712 can determine the user profile 236 by organizing, grouping, or linking specific information corresponding to each instance of the user, such as the first 112 or the second user 114. The personal-device module 712 can determine the device profile 232 by organizing, grouping, or linking specific information corresponding to each instance of the device, such as the first device 102, the second device 106, the third device 108, the fourth 110, or a combination thereof.

The personal-device module 712 can determine the device profile 232 including the device identification 234 of FIG. 2 for the specific instance of the device. The personal-device module 712 can determine a correlation or an association between the user profile 236 of FIG. 2 and the device profile 232, such as for ownership or accessibility.

The personal-device module 712 can determine the correlation or the association based on previous usage history, registration information, patterns or associations between groups of information, or a combination thereof. The personal-device module 712 can determine the user profile 236 corresponding to the device identification 234 for identifying the user, such as the first user 112 or the second user 114, of one or more device, such as the first device 102, the second device 106, the third device 108, the fourth 110, or a combination thereof.

The personal-device module 712 can further access determined information for further processing. For example, the personal-device module 712 can access the user profile 236, the device profile 232, the device identification 234 included therein or associated thereto, or a combination thereof. Also for example, the personal-device module 712 can access information from or through the device corresponding to the device identification 234.

The personal-device module 712 can access the user profile 236 to identify the device profile 232 associated with a specific user, or access the device profile 232 to identify the user profile 236 associated a specific device. The personal-device module 712 can access the device identification 234 for identifying one or more devices corresponding to the user, a location, a condition, or a combination thereof.

For example, the personal-device module 712 can use the first location unit 420 of FIG. 4, the third location unit 520 of FIG. 5, the fourth location unit 620 of FIG. 6, the reference source 218, or a combination thereof to determine a user or a device within the vehicle 202. The personal-device module 712 can access the current device location 240 of FIG. 2 for identifying one or more devices within the vehicle 202.

The personal-device module 712 can compare a signal strength, a location information, a context, an acceleration, or a combination thereof to determine the user or the device is within the vehicle 202. The personal-device module 712 can further use the cabin outline 204 to determine the user or the device within the vehicle 202. The personal-device module 712 can access the device identification 234 as described above for identifying the device within the vehicle 202.

The external module 714 is for determining or processing information external to the navigation system 100 or the vehicle. The external module 714 can determine or process the surroundings profile 344 of FIG. 3, the contextual input 238, other information external to the navigation system 100 or the vehicle 202, or a combination thereof.

For example, the external module 714 can determine or process the information from the vehicle sensor 206 directed to surrounding environments, such as camera capturing view through the windshield or a proximity detector. Also for example, the external module 714 can determine or process by collecting and identifying certain types of information or from specified sources, as predetermined by the navigation system 100.

The gathering module 702 can use the first user interface 418, the second user interface 438, the third user interface 518, the fourth user interface 618, the first communication unit 416, the second communication unit 436, the third communication unit 516, the fourth communication unit 616, or a combination thereof to collect or identify relevant information as described above. The gathering module 702 can further use the first control unit 412 of FIG. 4, the second control unit 434 of FIG. 4, the third control unit 512 of FIG. 5, the fourth control unit 612 of FIG. 6, or a combination thereof to process the relevant information, such as for comparing or determining.

The gathering module 702 can further access stored or previously determined information, such as for profiles or previously occurring data, using the first control interface 422 of FIG. 4, the second control interface 444 of FIG. 4, the third control interface 522 of FIG. 4, the fourth control interface 622 of FIG. 6, the first storage interface 424 of FIG. 4, the second storage interface 448 of FIG. 4, the third storage interface 524 of FIG. 5, the fourth storage interface 624 of FIG. 6, or a combination thereof. The gathering module 702 can store processing results, such profiles or the contextual input 238, in the first storage unit 414 of FIG. 4, the second storage unit 446 of FIG. 4, the third storage unit 514 of FIG. 5, the fourth storage unit 614 of FIG. 6, or a combination thereof.

After determining information associated with the vehicle 202, the control flow can pass from the gathering module 702 to the distinction module 704, the context module 706, or a combination thereof. The control flow can pass by having a processing result, such as the vehicle-source data 224 or the device profile 232, as an output from the gathering module 702 to an input of the distinction module 704, the context module 706, or a combination thereof. The control flow can further pass by storing the processing result at a location known and accessible to the distinction module 704, the context module 706, or a combination thereof. The control flow can further pass by notifying distinction module 704, the context module 706, or a combination thereof, such as by using a flag, an interrupt, a status signal, or a combination thereof. The control flow can further pass using a combination of the processes described above.

The distinction module 704 is for determining a relationship between the user's function relative to the vehicle 202 and one or more devices. The distinction module 704 can determine the maneuver-relative status 250 of FIG. 2. The distinction module 704 can generate the maneuver-relative status 250 corresponding to the device identification 234 for representing the relationship between a user of one or more devices in the navigation system 100 and the vehicle 202. The distinction module 704 can determine a user or a device associated with the user as the driver distinction 252 of FIG. 2 or the passenger distinction 254 of FIG. 2.

The distinction module 704 can generate the maneuver-relative status 250 using a variety of methods. For example, the distinction module 704 can generate the maneuver-relative status 250 based on the device relative-location 230 of FIG. 2, the vehicle-source data 224, or a combination thereof.

The distinction module 704 can include a device-location module 716. The device-location module 716 is for calculating the device relative-location 230. The device-location module 716 can calculate the device relative-location 230 using detailed location information within the vehicle 202.

The device-location module 716 can use the current device location 240, signal strength or delay, or a combination thereof to calculate the device relative-location 230. For example, the device-location module 716 can use a reference signal from the reference source 218 or an exchange between one or more devices to calculate the device relative-location 230. Also for example, the device-location module 716 can use variety of methods, such as triangulation or stereoscopic signal detection, to calculate the device relative-location 230.

The device-location module 716 can calculate the device relative-location 230 relative to the cabin outline 204, the reference source 218, or a combination thereof. For example, the device-location module 716 can calculate the device relative-location 230 as being near, at, or in a designated area predetermined by the navigation system 100 according to a design of the vehicle 202 for directly interfacing with designed maneuver or control interface for the vehicle 202. The device-location module 716 can calculate the device relative-location 230 corresponding to the device identification 234 for representing the device relative-location 230 within the vehicle 202.

The distinction module 704 can distinguish the person or the device for the maneuver-relative status 250 based on the device relative-location 230. For example, the distinction module 704 can distinguish the person or the device with the driver distinction 252 when the device relative-location 230 is near, at, or in the designated area, such as a driver seat, within a cockpit or a control room, or a combination thereof. The distinction module 704 can distinguish the person or the device with the passenger distinction 254 when the device relative-location 230 is outside of the predetermined area, or within a separate predetermined area designated for passengers, such as a passenger seat or a cabin.

The distinction module 704 can further distinguish the person or the device for the maneuver-relative status 250 based on the vehicle-source data 224 from the cabin sensor 208 of FIG. 2 or the vehicle link mechanism 220. For example, the distinction module 704 can determine the person in the driver seat or the passenger seat based on image recognition for images captured on the cabin camera 210. The distinction module 704 can determine the person according facial features in the user profile 236 and identify corresponding instance of the device profile 232 for the driver.

Also for example, the distinction module 704 can identify the device connected through the vehicle link mechanism 220. The distinction module 704 can determine changes or shifts in the seat sensor 212 corresponding to interacting with the device connect through the vehicle link mechanism 220 to identify a seat location of the owner of the device. The distinction module 704 can further determine acceleration or a movement pattern of the device before or after connecting through the vehicle link mechanism 220 to identify a seat location of the owner of the device. The distinction module 704 can generate the maneuver-relative status based on the determined seat location of the owner of the device.

The context module 706 can generate the maneuver-relative status 250 without information from the user directed or intended for the maneuver-relative status 250. The context module 706 can generate the maneuver-relative status 250 without any direct interaction, such as user generated selection or input information, intended for identifying the maneuver-relative status 250. The context module 706 can seamlessly and integrally identify the maneuver-relative status 250 through available information and natural interaction between the navigation system 100 and the user.

It has been discovered that the maneuver-relative status 250 generated from the incidental interaction without direct selection or command from the user provides enhanced usability. The navigation system 100 can use the available information and the information resulting from natural interactions as described above without specifically querying or receiving direct information for the maneuver-relative status 250.

The distinction module 704 can use the first control unit 412, the second control unit 434, the third control unit 512, the fourth control unit 612, or a combination thereof to generate the maneuver-relative status 250. The distinction module 704 can use the first communication unit 416, the second communication unit 436, the third communication unit 516, the fourth communication unit 616, or a combination thereof to communicate and exchange the maneuver-relative status 250 or other related information between devices. The distinction module 704 can store the maneuver-relative status 250 in the first storage unit 414, the second storage unit 446, the third storage unit 514, the fourth storage unit 614, or a combination thereof.

After determining the relationship between the user's function and the device, the control flow can pass from the distinction module 704 to the function control module 708. The control flow can pass similarly as described above between the gathering module 702 and the distinction module 704, but using processing results of the distinction module 704, such as the device relative-location 230 or the maneuver-relative status 250.

The context module 706 is for determining a condition or a situation associated with the vehicle 202. The context module 706 can determine the contextual estimation 242 of FIG. 2.

The context module 706 can determine the contextual estimation 242 by identifying a category, a value, a title, or a combination thereof representing a condition or a situation as predetermined by the navigation system 100. The context module 706 can determine the contextual estimation 242 based on the contextual input 238, the vehicle-source data 224, the external data, or a combination thereof. The context module 706 can further determine the contextual estimation 242 based on processing results, such as the device profile 232, the user profile 236, the maneuver-relative status 250, or a combination thereof.

The context module 706 can determine the contextual estimation 242 including the cabin emergency trigger 244 of FIG. 2 for representing a status of the user. The context module 706 can determine the cabin emergency trigger 244 in a variety of ways. For example, the context module 706 can determine the cabin emergency trigger 244 based on the vehicle-source data 224, such as the cabin data 228 from the bio-sensor 214, a microphone, the cabin camera 210, or a combination thereof.

Also for example, the context module 706 can determine the cabin emergency trigger 244 based on the movement data 226 of FIG. 2 or status information from the functional sensor 216, a sequence or a combination of specific values for the contextual input 238, or a combination thereof. Also for example, the context module 706 can determine the cabin emergency trigger 244 based on the user profile 236, such as for medical records, known and listed health status, or a combination thereof.

As a more specific example, the context module 706 can determine the cabin emergency trigger 244 corresponding to the driver or the passenger losing consciousness, having urgent health-related needs, being inattentive, or a combination thereof. Also as a more specific example, the context module 706 can determine the cabin emergency trigger 244 corresponding to the vehicle 202 being involved in a crash or an accident.

The context module 706 can further determine the severity estimation 246 of FIG. 2, the time-window estimation 248 of FIG. 2, or a combination thereof. The context module 706 can determine the severity estimation 246, the time-window estimation 248, or a combination thereof based on the contextual input 238, the movement data 226, the user profile 236, the device identification 234, the maneuver-relative status 250, the vehicle-source data 224, a time or a duration associated therewith, or a combination thereof.

For example, the context module 706 can include or access a time or a duration associated with a specific instance of the cabin emergency trigger 244 for determining the time-window estimation 248. The context module 706 can determine the time-window estimation 248 as the time or the duration corresponding to the determined instance of the cabin emergency trigger 244.

Also for example, the context module 706 can include one or more values for the contextual input 238, the movement data 226, the user profile 236, the device identification 234, the maneuver-relative status 250, the vehicle-source data 224, a time or a duration associated therewith for representing a value of the severity estimation 246. As a more specific example, the context module 706 can include factors including words uttered, heart rate or intensity pattern, breathing pattern, body movement pattern or posture, vehicle movement pattern, category of information sourcing device, position or location of corresponding user, or a combination thereof corresponding to different values of the severity estimation 246.

The context module 706 can use the first control unit 412, the second control unit 434, the third control unit 512, the fourth control unit 612, or a combination thereof to determine the condition or the situation associated with the vehicle 202. The context module 706 can store one or more processing results, such as the contextual estimation 242 or the cabin emergency trigger 244, in the first storage unit 414, the second storage unit 446, the third storage unit 514, the fourth storage unit 614, or a combination thereof.

After determining the condition or the situation associated with the vehicle 202, the control flow can pass from the context module 706 to the function control module 708. The control flow can pass similarly as described above between the gathering module 702 and the distinction module 704, but using processing results of the context module 706, including the contextual estimation 242.

The function control module 708 is for controlling one or more devices in the navigation system 100 based on the maneuver-relative status 250. The function control module 708 can control one or more devices by generating the device function profile 302 of FIG. 2.

The function control module 708 can generate the device function profile 302 based on the user profile 236, the maneuver-relative status 250, the device profile 232, the contextual estimation 242, or a combination thereof. The function control module 708 can generate the device function profile 302 corresponding to the device identification 234 based on the maneuver-relative status 250 for controlling an interaction between the first device 102, the second device 106, the third device 108, the fourth device 110, or a combination thereof and the vehicle 202 based on the relationship between the first user 112, the second user 114, or a combination thereof and the vehicle 202.

The function control module 708 can generate the device function profile 302 for controlling and managing one or more feature, control, command, access thereto, or a combination thereof for the first device 102, the second device 106, the third device 108, the fourth device 110, or a combination thereof. The function control module 708 can generate the device function profile 302 for accessing the vehicle 202 using the first device 102, the second device 106, the third device 108, the fourth device 110, or a combination thereof within the vehicle 202, external to the vehicle 202, or a combination thereof.

For example, the function control module 708 can generate the device function profile 302 for limiting access to a device or a function therein based on the driver distinction 252 or the passenger distinction 254. Also for example, the function control module 708 can generate the device function profile 302 for controlling a function or a maneuver of the vehicle 202.

The function control module 708 can generate the device function profile 302 in a variety of ways. For example, the function control module 708 can generate the device function profile 302 for controlling a configuration or a setting of one or more device in the navigation system 100. As a more specific example, the function control module 708 can generate the device function profile 302 to enable or disable a feature or a command associated with the device, such as disabling tactile interaction or enabling specific output mode.

Also for example, the function control module 708 can generate the device function profile 302 for enabling a sequence of commands, steps, instructions, or a combination thereof for controlling one or more device in the navigation system 100. As a more specific example, the function control module 708 can generate the device function profile 302 by identifying and availing one or a sequence of commands, steps, instructions, or a combination thereof for the one or more device, such as for controlling or operating the vehicle 202, contacting or communicating with another device, entity, person, service, or a combination thereof, providing an interface for controlling or operating the vehicle 202, calculating a destination or a route for directing the vehicle 202, or a combination of processes thereof.

The function control module 708 can generate the device function profile 302 in response to or corresponding to the maneuver-relative status 250, the contextual estimation 242, the user profile 236, the device profile 232, or a combination thereof. For example, the function control module 708 can generate the device function profile 302 for specifically configuring the first device 102 associated with the driver distinction 252, the third device 108 associated with the passenger distinction 254, or a combination thereof according to the device profile 232.

Also for example, the function control module 708 can generate the device function profile 302 for responding to specific situations or conditions represented by the contextual estimation 242, specific features or control access to the user according to the user profile 236, or a combination thereof. Also for example, the function control module 708 can generate the device function profile 302 by loading or initiating a command, a feature, an instruction, a command, a link, a process or a combination thereof on one or more devices in the navigation system 100.

It has been discovered that the cabin emergency trigger 244 and the device function profile 302 provide increased safety and usability. The navigation system 100 can detect emergency situations within the cabin outline 204 with the cabin emergency trigger 244 and autonomously control one or more devices with the device function profile 302 to provide assistance or protection for the user within the cabin outline 204.

The function control module 708 can generate the device function profile 302 using a device control module 718, an emergency communication module 720, an emergency routing module 722, a vehicle control module 724, a control implementation module 726, or a combination thereof. The device control module 718 is for controlling a usage or an access of the one or more device in the navigation system 100 for one or more users of thereof. The device control module 718 can be for controlling communication or interaction between a user and a device for the navigation system 100.

The device control module 718 can control the usage or the access by generating the device function profile 302 including the access profile 304 of FIG. 3, the output profile 312 of FIG. 3, or a combination thereof. The device control module 718 can generate the device function profile 302 by generating one or a set of configuration or setting values for one or more of personal devices, such as the first device 102, the third device 108, the fourth device 110, or a combination thereof.

The device control module 718 can generate the device function profile 302 including the access profile 304, the output profile 312, or a combination thereof specific for the driver distinction 252 or the passenger distinction 254 for controlling the vehicle 202. The device control module 718 can further generate the access profile 304, the output profile 312, or a combination thereof corresponding to the user profile 236.

For example, the device control module 718 can generate the access profile 304 by including settings and values thereof in the driver function 306 of FIG. 3 for disabling visual output or tactile input, disabling or stopping specific applications, such as game or visual medial player, enabling locating or routing functions, enabling sharing or updating location, enabling or linking to short-range or intra-vehicle communication, or a combination thereof for the user or the device associated with the driver distinction 252. Also for example, the device control module 718 can generate the access profile 304 by including settings and values thereof in the navigator function 308 of FIG. 3 for enabling access to navigational functions, enabling a link with the vehicle 202 through the vehicle link mechanism 220, enabling control over communication functions, or a combination thereof for the user or the device associated with the passenger distinction 254 and specified instance of the user profile 236, such as based on age, prior usage, relationship with the owner of the vehicle 202, accessibility level, title, or a combination thereof.

Also for example, the device control module 718 can generate the access profile 304 by including settings and values thereof in the passenger function 310 of FIG. 3 for enabling or disabling control over specific functions or subsystems within the vehicle 202, such as the entertainment system, a window, a door, a chair, a temperature setting, or a combination thereof. The device control module 718 can generate the passenger function 310 based on the user profile 236 as described above.

Also for example, the device control module 718 can generate the access profile 304 by identifying a pattern, a favorite list, a refined and reduced search set, or a combination thereof corresponding to the user profile 236 and the maneuver-relative status 250. As a more specific example, the device control module 718 can load specific usage patterns or affinity of the first user 112, limited or focused search candidates, preferred locations or search categories, or a combination thereof in the driver function 306. Also as a more specific example, the device control module 718 can load similar specific data in the navigator function 308 or the passenger function 310 corresponding to the second user 114.

The device control module 718 can further generate the access profile 304 to include the output profile 312 of FIG. 3 for controlling communication of information to the user. For example, the device control module 718 can generate the access profile 304 by including output modes, such as audible output for speaker, short-range or intra-vehicle communication link, visual output for an interface screen, tactile output, or a combination thereof corresponding to the first user 112, the second user 114, or a combination thereof. Also for example, the device control module 718 can generate the access profile 304 by including levels or values for preferred settings, last-known settings, favorites, or a combination thereof, such as for volume, brightness, mode, frequency, default, or a combination thereof.

The device control module 718 can further generate the access profile 304 for implementing the contextual update 320 of FIG. 3. The navigation system 100 can use one or more devices of the navigation system 100 to autonomously update the first user 112 or the second user regarding contextual update 320. The update can be according to the output profile 312, the access profile 304, or a combination thereof.

It has been discovered that the maneuver-relative status 250 and the device function profile 302 including the access profile 304 provide improved usability and driver safety. The navigation system 100 can identify a driver or a user controlling the vehicle 202 through detecting natural interactions and without specific command or selection from the driver with the maneuver-relative status 250. The navigation system 100 can control access and setting of one or more devices in the navigation system 100 for the driver or the passenger for reducing distractions while providing faster and efficient access to maneuver-related features.

The function control module 708 can use the emergency communication module 720, the emergency routing module 722, the vehicle control module 724, or a combination thereof to generate the device function profile 302 including the feature profile 318 of FIG. 3 for controlling the first device 102, the second device 106, the third device 108, the fourth device 110, or a combination thereof relative to the vehicle 202. The emergency communication module 720 is for controlling a communication function of one or more devices in the navigation system 100.

The emergency communication module 720 can communicate or exchange the emergency data set 328 of FIG. 3 through the emergency contact mechanism 322 of FIG. 3. The emergency communication module 720 can use the steps, the process, the method, or a combination thereof according to the emergency contact mechanism 322 to determine a communication target. The emergency communication module 720 can determine the communication target based on the contextual estimation 242, the cabin emergency trigger 244, a categorization thereof, or a combination thereof.

For example, the emergency communication module 720 can determine the communication target as a medical service, a hospital, a personal physician, an emergency medical service, or a combination thereof for health-related instances of the cabin emergency trigger 244. Also for example, the emergency communication module 720 can determine the communication target based on the severity estimation 246. As a more specific example, a parent or an emergency contact can be the communication target for values less than a threshold or outside of a specified category, and a medical service or a doctor can be the communication target for values greater than the threshold or within the specified category.

Also for example, the emergency communication module 720 can determine the communication target as other users or other devices associated or related to the user associated with the cabin emergency trigger 244, such as for parents or emergency contact. Also for example, the emergency communication module 720 can determine the communication target as a preferred instance, a closest instance, a designated instance, or a combination thereof for within the qualifying category.

The emergency communication module 720 can determine the emergency data set 328 for communicating with the communication target. The emergency communication module 720 can determine the emergency data set 328 by identifying the vehicle-source data 224, the contextual input 238, the user profile 236, a portion therein, or a combination thereof associated with the cabin emergency trigger 244.

For example, the emergency communication module 720 can determine the health metric 330 of FIG. 3 based on information from the bio-sensor 214, the first device 102, the third device 108, the cabin data 228, the movement data 226 before or after the cabin emergency trigger 244, the contextual estimation 242, description of user's health conditions in the user profile 236, or a combination thereof. Also for example, the emergency communication module 720 can determine the vehicle status 332 of FIG. 3 based on information from the functional sensor 216, the contextual estimation 242, or a combination thereof. Also for example, the emergency communication module 720 can determine the vehicle location 334 of FIG. 3 based on the current device location 240, the movement data 226, a route or navigation data, or a combination thereof.

The emergency communication module 720 can further determine a protocol, such as for timing or sequence of exchanging information, for communicating with the communication target. The emergency communication module 720 can determine the communication protocol based on the communication target and associated communication methods or protocols predetermined by the navigation system 100.

It has been discovered that the cabin emergency trigger 244, the maneuver-relative status 250, and the feature profile 318 based on the emergency contact mechanism 322 with the emergency data set 328 provide increased safety for the user. The navigation system 100 can use the cabin emergency trigger 244 and the maneuver-relative status 250 to identify emergency situations involving the driver. The navigation system 100 can use the feature profile 318 based on the emergency contact mechanism 322 with the emergency data set 328 to immediately contact appropriate parties to seek assistance. The autonomous contact and communication of relevant information can reduce response time for the emergency by eliminating reliance on an observer or the driver to seek assistance.

The emergency routing module 722 is for calculating an emergency route to an emergency destination using the emergency routing mechanism 324 of FIG. 3. The emergency routing module 722 can use the emergency routing mechanism 324 to determine the emergency destination. The emergency routing module 722 can determine the emergency destination similar to the determination of the communication target.

For example, the emergency destination can be a geographical location for the communication target or a location associated with the communication target, such as a satellite office or a midway point between current location of the emergency response team and the vehicle location 334. Also for example, the emergency destination can be a location received from the communication target or calculated in conjunction with the communication target. Also for example, the emergency destination can be a location separately identified based on contextual estimation 242, the cabin emergency trigger 244, a categorization thereof, or a combination thereof.

The emergency routing module 722 can calculate a route for travelling from the vehicle location 334 to the emergency destination. For example, the emergency routing module 722 can use a route calculation mechanism for calculating the fastest route. Also for example, the emergency routing module 722 can interact with the communication target to calculate or update the route.

It has been discovered that the cabin emergency trigger 244 and the emergency routing mechanism 324 provide improved usability and response time for emergency situations. The navigation system 100 can use the cabin emergency trigger 244 to detect the emergency situation within the cabin outline 204. The navigation system 100 can use the emergency routing mechanism 324 to immediately provide a location for finding assistance. The autonomous and immediate reaction can eliminate time required for the user to interact with the navigation system 100 to find the location for the assistance, eliminate a possibility of finding a sub-optimal location, and eliminate possibility of detrimental user error resulting from heightened stress due to the emergency situation.

The vehicle control module 724 is for controlling a function or a feature associated with maneuvering the vehicle 202. The vehicle control module 724 can generate the feature profile 318 for maneuvering the vehicle 202 or for controlling any functions associated therewith autonomously without maneuver commands from the driver. The vehicle control module 724 can further generate the feature profile 318 for controlling the vehicle 202 through the first device 102, the second device 106, the third device 108, the fourth device 110, or a combination thereof.

The vehicle control module 724 can generate the feature profile 318 for allowing and enabling a user other than the driver to maneuver the vehicle 202. The vehicle control module 724 can generate the feature profile 318 based on the emergency maneuver mechanism 326 of FIG. 3.

The vehicle control module 724 can use the emergency maneuver mechanism 326 to generate the local notification 336 of FIG. 3. The vehicle control module 724 can generate the local notification 336 by including a sequence of commands or instructions for operating communication portions of the navigation system 100 or the vehicle 202.

For example, the vehicle control module 724 can generate the local notification 336 for controlling maneuver-related communicative portions of the vehicle 202, such as head lights, turn signals, hazard signal, horn, or a combination thereof. Also for example, the vehicle control module 724 can generate the local notification 336 for controlling communicative portions unrelated to maneuvering the vehicle 202, such as cabin lights, public announcement system, radio, or a combination thereof.

As a more specific example, the vehicle control module 724 can generate the local notification 336 for tuning the car radio to a specified frequency for receiving an emergency message and playing the emergency message through the speaker system. Also as a more specific example, the vehicle control module 724 can generate the local notification 336 for controlling short-range or inter-vehicle communication, such as for short-range broadcasting or through a server, including the second device 106.

The vehicle control module 724 can use the emergency maneuver mechanism 326 to generate the control shift 338 of FIG. 3 for allowing and enabling a user other than the driver to maneuver the vehicle 202. The vehicle control module 724 can generate the control shift 338 corresponding to the cabin emergency trigger 244 for enabling the second user 114 instead of the first user 112 to maneuver the vehicle 202.

The vehicle control module 724 can select a passenger or a different user external to the vehicle 202 for allowing and enabling maneuver of the vehicle 202. For example, the vehicle control module 724 can initiate the control shift 338 for selecting a system, a device, a service, a designated user, or a combination thereof external to the vehicle 202 to control or maneuver the vehicle 202 instead of the first user 112 designated with the driver distinction 252.

Also for example, the vehicle control module 724 can generate the control shift 338 to initiate for selecting a passenger, such as the second user 114, to control or maneuver the vehicle 202 instead of the first user 112 designated with the driver distinction 252. The vehicle control module 724 can select the passenger based on the user profile 236, such as based on age or valid license for operating the vehicle 202.

The vehicle control module 724 can further generate the control shift 338 to initiate, enable, or avail the maneuver interface 342 of FIG. 3 on one or more display accessible to the selected passenger or different user. For example, the vehicle control module 724 can generate the control shift 338 to communicate the maneuver interface 342 to the first device 102, the second device 106, the third device 108, the fourth device 110, or a combination thereof. The vehicle control module 724 can generate the control shift 338 to receive and implement commands or control signals from, to relay or display a status or an output from the vehicle sensor 206, or a combination of processes thereof to the selected passenger or different user through the maneuver interface 342.

As a more specific example, the vehicle control module 724 can generate the control shift 338 to determine the surroundings profile 344. The vehicle control module 724 can generate the control shift 338 to receive, relay, or display outputs from the vehicle sensor 206, such as externally-facing cameras, radars, other sensors, or a combination thereof. The vehicle control module 724 can generate the control shift 338 to communicate the surroundings profile 344 to the selected passenger or different user through the maneuver interface 342.

The vehicle control module 724 can further generate the control shift 338 initiate, enable, or implement the input-lockout 346 of FIG. 3. The vehicle control module 724 can generate the control shift 338 to block or ignore controlling or maneuvering signals for the vehicle 202 from the first user 112 or the first device 102 associated with the driver distinction 252.

The control shift 338 can include blocking or ignoring such signals from the first device 102, a designated controller, such as a steering wheel or a speed controller, or a combination thereof. The vehicle control module 724 can generate the control shift 338 to apply and execute the controlling or maneuvering signals or commands received through the maneuver interface 342 and to block or ignore controlling or maneuvering signals for the vehicle 202. The control shift 338 can include blocking or ignoring signals or controls having specified characteristics, such as change in speed or change in direction within a predetermined range without external dangers or obstacles within a predetermined distance for representing sharp or uncharacteristic movement unrelated to normal guiding or maneuvering of the vehicle 202.

The vehicle control module 724 can further generate the device-directed maneuver 340 of FIG. 3 for autonomously controlling or maneuvering the vehicle 202 without input or interaction from any user regarding maneuvering of the vehicle 202. The vehicle control module 724 can generate the device-directed maneuver 340 corresponding to the cabin emergency trigger 244 for maneuvering the vehicle 202 independent of the first user 112 and the second user 114.

The vehicle control module 724 can generate the device-directed maneuver 340 by receiving and determining the surroundings profile 344 as described above. The vehicle control module 724 can generate the device-directed maneuver 340 by also including the input-lockout 346 as described above.

It has been discovered that the input-lockout 346 based on the cabin emergency trigger 244 and the maneuver-relative status 250 provides improved safety for the people in the vehicle 202 and near the vehicle 202. The navigation system 100 can use the input-lockout 346 based on identifying emergency situations with the first user 112 involuntarily providing control signals or commands with the cabin emergency trigger 244 and the maneuver-relative status 250. The navigation system 100 can ignore the involuntary control signals or commands using the input-lockout 346 to eliminate potential harm to the people within or around the vehicle 202 due to the involuntary control signals or commands.

The vehicle control module 724 can generate the device-directed maneuver 340 by including a step, an instruction, a timing, a rule or a condition, a process, or a combination thereof for maneuvering the vehicle 202. The vehicle control module 724 can generate the device-directed maneuver 340 similar to an auto-pilot mechanism. The vehicle control module 724 can generate the device-directed maneuver 340 for the immediate stop scenario 348 of FIG. 3, the pull-over scenario 350 of FIG. 3, the routing scenario 352 of FIG. 3, or a combination thereof.

The vehicle control module 724 can generate the device-directed maneuver 340 for immediately stopping the vehicle 202 with the immediate stop scenario 348. The vehicle control module 724 can generate the device-directed maneuver 340 for applying a stopping or decelerating mechanism of the vehicle 202.

The vehicle control module 724 can generate the device-directed maneuver 340 by including steps or instructions for determining a deceleration rate, for following the road while stopping the vehicle 202, or a combination thereof based on analyzing the surroundings profile 344.

The vehicle control module 724 can include in the immediate stop scenario 348 rules, conditions, cases, or situations for adjusting the deceleration rate or for following the road or a lane in a road while decelerating the vehicle 202 to a stop.

The vehicle control module 724 can generate the device-directed maneuver 340 for immediately maneuvering the vehicle 202 to stop at a designated location with the pull-over scenario 350. The vehicle control module 724 can generate the device-directed maneuver 340 for determining the designated stop location and maneuvering the vehicle 202 to a stop at the designated stop location.

The vehicle control module 724 can generate the device-directed maneuver 340 by including steps or instructions for identifying the designated stop location. The vehicle control module 724 can generate the pull-over scenario 350 to identify a category of location predetermined by the navigation system 100 in the surroundings profile 344, along a currently applicable route, on a map within a threshold distance from the vehicle location 334, or a combination thereof. For example, the vehicle control module 724 can generate the pull-over scenario 350 to identify a nearest instance of a shoulder, a parking lot, a turnout, a driveway, or a combination thereof.

The vehicle control module 724 can generate the device-directed maneuver 340 by including steps or instructions for maneuvering the vehicle 202, such as for controlling speed or acceleration, for controlling direction, or a combination thereof. The vehicle control module 724 can further generate the device-directed maneuver 340 by including steps or instructions for analyzing the surroundings profile 344 and maneuvering the vehicle 202 accordingly. For example, the vehicle control module 724 can include a step or an instruction to check an area adjacent to the vehicle before deviating out of a lane or a road, a case or a condition for determining a timing or a change in speed for implementing the deviation, or a combination thereof.

The vehicle control module 724 can further generate the device-directed maneuver 340 to combine the pull-over scenario 350 with the immediate stop scenario 348. For example, the vehicle control module 724 can initiate the pull-over scenario 350 first and then implement the immediate stop scenario 348 when the designated stop location is unavailable within a threshold distance or time, when the vehicle 202 passes the designated stop location, when the maneuvering according to the rules or conditions are not applicable, based on a limiting duration for a maneuver or reaching the designated stop location, based on a change in the contextual estimation 242, or a combination thereof.

The vehicle control module 724 can generate the device-directed maneuver 340 for maneuvering the vehicle 202 along the route calculated according to the emergency routing mechanism 324. The vehicle control module 724 can generate the device-directed maneuver 340 for the routing scenario 352 similar to the pull-over scenario 350. For example, the vehicle control module 724 can generate the device-directed maneuver 340 by including steps or instructions for analyzing the surroundings profile 344 and maneuvering the vehicle 202 accordingly.

The vehicle control module 724 can further generate the device-directed maneuver 340 including maneuvering the vehicle 202 according to the routing instructions. For example, the vehicle control module 724 can include the instructions for following a sequence of maneuvers. The vehicle control module 724 can include the steps or instructions for analyzing the surroundings profile 344 and following the rules or conditions in response to the surroundings profile 344 to execute the sequence of maneuvers.

The vehicle control module 724 can further generate the device-directed maneuver 340 to combine the pull-over scenario 350, the immediate stop scenario 348, the emergency contact mechanism 322, or a combination thereof with the routing scenario 352. For example, the vehicle control module 724 can initiate the routing scenario 352 first, then implement the pull-over scenario 350, and then implement the immediate stop scenario 348 based on conditions similar to ones described above. Also for example, the vehicle control module 724 can maneuver the vehicle 202 while updating the communication target or adjusting the routing destination.

It has been discovered that the maneuver-relative status 250, the cabin emergency trigger 244, and the feature profile 318 based on the emergency maneuver mechanism 326 provide increased safety for the user in emergency situations. The navigation system 100 can use the maneuver-relative status 250 and the cabin emergency trigger 244 to determine emergency scenarios involving the driver, especially while the vehicle 202 is in motion. The navigation system 100 can use the feature profile 318 to physically maneuver or control the vehicle 202 to provide safety for the user and other vehicles or users near by the vehicle 202.

It has also been discovered that the maneuver-relative status 250, the cabin emergency trigger 244, and the local notification 336 provide improved communication with surrounding environment during emergency situations. The navigation system 100 can use the local notification 336 to operate the communication based portions of one or more device in the system to contact and communicate people or vehicles near the vehicle 202 and the distressed user to seek immediate assistance, such as yielding or locating a different user within a proximity with ability to provide assistance.

It has also been discovered that the maneuver-relative status 250, the cabin emergency trigger 244, and the control shift 338 with the maneuver interface 342 provide improved safety for the user. The control shift 338 can be used to enable a different user to provide assistance to the driver in distress by maneuvering the vehicle 202 in place of the distressed driver.

It has also been discovered that the maneuver-relative status 250, the cabin emergency trigger 244, and the device-directed maneuver 340 provide improved safety for the people within and around the vehicle 202 during emergency situations. The navigation system 100 can use the device-directed maneuver 340 to maneuver the vehicle 202 when the driver becomes incapable of maneuvering the vehicle 202 due to the emergency situation.

The control implementation module 726 is for implementing the device function profile 302 in response to the contextual estimation 242 and based on the maneuver-relative status 250. The control implementation module 726 can use the first control interface 422, the second control interface 444, the third control interface 522, the fourth control interface 622, or a combination thereof to interact with components, configurations, settings, or a combination thereof for one or more devices in the navigation system 100. The control implementation module 726 can further use the first control interface 422, the second control interface 444, the third control interface 522, the fourth control interface 622, the first communication unit 416, the second communication unit 436, the third communication unit 516, the fourth communication unit 616, the vehicle link mechanism 220, or a combination thereof to access, control, interact with, or a combination thereof for the vehicle 202.

The control implementation module 726 can combine different portions of the feature profile 318. For example, the control implementation module 726 can sequentially implement results of the emergency contact mechanism 322, the emergency routing mechanism 324, the emergency maneuver mechanism 326, or a combination thereof. Also for example, the control implementation module 726 can sequentially implement the input-lockout 346, the routing scenario 352, the pull-over scenario 350, the immediate stop scenario 348, in that specified sequence, or a combination thereof.

The function control module 708 can use the first control unit 412, the second control unit 434, the third control unit 512, the fourth control unit 612, or a combination thereof to generate the device function profile 302. The function control module 708 can store the device function profile 302 in the first storage unit 414, the second storage unit 446, the third storage unit 514, the fourth storage unit 614, or a combination thereof. The function control module 708 can communicate, such as for loading or transferring, the device function profile 302 using first control interface 422, the second control interface 444, the third control interface 522, the fourth control interface 622, the first communication unit 416, the second communication unit 436, the third communication unit 516, the fourth communication unit 616, the vehicle link mechanism 220, or a combination thereof.

The modules described in this application can be hardware implementation or hardware accelerators, including passive circuitry, active circuitry, or both, in the first storage unit 414, the second storage unit 446, the third storage unit 514, the fourth storage unit 614, the first control unit 416, the second control unit 438, the third control unit 516, the fourth control unit 616, or a combination thereof. The modules can also be hardware implementation or hardware accelerators, including passive circuitry, active circuitry, or both, within the first device 102, the second device 106, the third device 108, the fourth device 110, or a combination thereof but outside of the first storage unit 414, the second storage unit 446, the third storage unit 514, the fourth storage unit 614, the first control unit 416, the second control unit 438, the third control unit 516, the fourth control unit 616, or a combination thereof.

The navigation system 100 has been described with module functions or order as an example. The navigation system 100 can partition the modules differently or order the modules differently. For example, the functions of the distinction module 704 and the context module 706 can be combined. Also for example, the navigation system 100 can include the distinction module 704 and the context module 706 in parallel or in series.

For illustrative purposes, the various modules have been described as being specific to the first device 102, the second device 106, the third device 108, or the fourth device 110. However, it is understood that the modules can be distributed differently. For example, the various modules can be implemented in a different device, or the functionalities of the modules can be distributed across multiple devices. Also as an example, the various modules can be stored in a non-transitory memory medium As a more specific example, one or more modules described above can be stored in the non-transitory memory medium for distribution to a different system, a different device, a different user, or a combination thereof, for manufacturing, or a combination thereof. Also as a more specific example, the modules described above can be implemented or stored using a single hardware unit, such as a chip or a processor, or across multiple hardware units.

The modules described in this application can be stored in the non-transitory computer readable medium. The first storage unit 414, the second storage unit 446, the third storage unit 514, the fourth storage unit 614, or a combination thereof can represent the non-transitory computer readable medium. The first storage unit 414, the second storage unit 446, the third storage unit 514, the fourth storage unit 614, or a combination thereof, or a portion therein can be removable from the first device 102, the second device 106, the third device 108, the fourth device 110, or a combination thereof. Examples of the non-transitory computer readable medium can be a non-volatile memory card or stick, an external hard disk drive, a tape cassette, or an optical disk.

The physical transformation from maneuver-relative status 250, the contextual estimation 242, or the device function profile 302 results in the movement in the physical world, such as content displayed or recreated for the user on one or more of the devices or maneuvering of the vehicle 202. Movement in the physical world results in changes to data regarding the maneuver-relative status 250, the vehicle location 334, or the contextual input 238, which can be fed back into the navigation system 100 and further influence the contextual estimation 242, the maneuver-relative status 250, or the device function profile 302.

Figure 8:
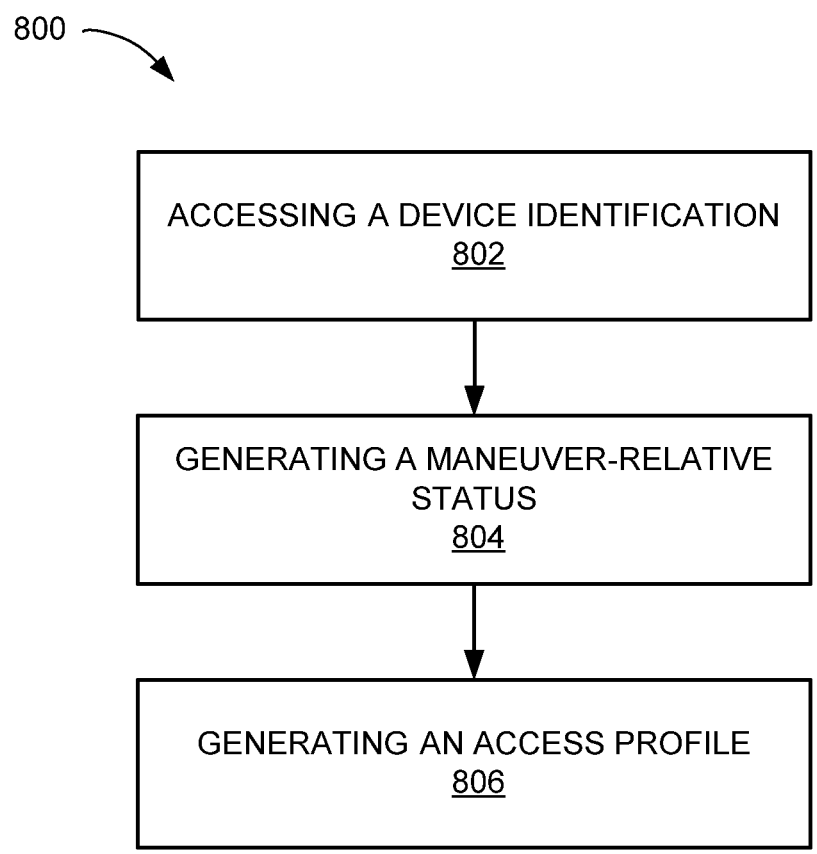
FIG. 8 is a flow chart of a method of operation of a navigation system in an embodiment of the present invention.

Referring now to FIG. 8, therein is shown a flow chart of a method 800 of operation of a navigation system 100 in an embodiment of the present invention. The method 800 includes: accessing a device identification for identifying a device in a block 802; generating a maneuver-relative status corresponding to the device identification with a control unit for representing the device associated with maneuvering a vehicle in a block 804; and generating an access profile corresponding to the device identification based on the maneuver-relative status for controlling the device or the vehicle in a block 806.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of an embodiment of the present invention is that it valuably supports and services the historical trend of reducing costs, simplifying systems, and increasing performance.

These and other valuable aspects of an embodiment of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A method of operation of a navigation system comprising:
   accessing a device identification for identifying a device;
   determining a contextual estimation for describing an event, a reason, a purpose, a goal or a combination thereof associated with the device;
   generating a maneuver-relative status corresponding to the device identification with a control unit for representing the device associated with a person with designation of maneuvering a vehicle amongst multiple devices within the vehicle; and
   generating a device function profile corresponding to the device identification based on the maneuver-relative status and the contextual estimation for enabling the person to control the device or the vehicle according to the maneuver-relative status.

2. The method as claimed in claim 1 wherein generating the maneuver-relative status includes:
   identifying a cabin outline for representing the vehicle;
   calculating a device relative-location relative to the cabin outline and corresponding to the device identification for representing the device relative-location within the vehicle; and
   generating the maneuver-relative status based on the device relative-location.

3. The method as claimed in claim 1 wherein generating the maneuver-relative status includes:
   communicating vehicle-source data for identifying the vehicle-source data from the vehicle; and
   generating the maneuver-relative status based on the vehicle-source data.

4. The method as claimed in claim 1 wherein generating the maneuver-relative status includes:

generating a vehicle link status for representing an interaction between the device and the vehicle; and
generating the maneuver-relative status based on the vehicle link status.

5. The method as claimed in claim 1 wherein generating the device function profile includes generating the device function profile including a feature profile for controlling the device relative to the vehicle.

6. The method as claimed in claim 1 wherein:
generating the maneuver-relative status includes distinguishing a driver distinction or a passenger distinction for representing a relationship between a user of the device and the vehicle; and
further comprising:
generating an access profile and an output profile corresponding to the device function profile specific for the driver distinction or the passenger distinction for controlling the vehicle.

7. The method as claimed in claim 1 further comprising:
determining a cabin emergency trigger based on contextual input, vehicle-source data, or a combination thereof for representing a status of the user; and
generating a device-directed maneuver corresponding to the cabin emergency trigger for maneuvering the vehicle independent of the user.

8. The method as claimed in claim 1 further comprising:
determining a cabin emergency trigger based on contextual input, vehicle-source data, or a combination thereof for representing a status of the user; and
generating a control shift corresponding to the cabin emergency trigger for enabling a further user to maneuver the vehicle.

9. The method as claimed in claim 1 wherein:
accessing the device identification includes accessing a current device location for identifying a location inside the vehicle corresponding to the device; and
generating the device function profile includes generating the device function profile for accessing the vehicle using the device within the vehicle.

10. The method as claimed in claim 1 further comprising:
determining a user profile corresponding to the device identification for identifying the user of the device; and
wherein:
generating the device function profile includes generating the device function profile based on the user profile.

11. A navigation system comprising:
a storage interface for accessing a device identification for identifying a device;
a control unit, coupled to the storage interface, for:
determining a contextual estimation for describing an event, a reason, a purpose, a goal or a combination thereof associated with the device;
generating a maneuver-relative status corresponding to the device identification for representing the device associated with a person with designation of maneuvering a vehicle amongst multiple devices within the vehicle, and
generating a device function profile corresponding to the device identification based on the maneuver-relative status and the contextual estimation for enabling the person to control the device or the vehicle according to the maneuver-relative status.

12. The system as claimed in claim 11 wherein the control unit is for:
identifying a cabin outline for representing the vehicle;
calculating a device relative-location relative to the cabin outline and corresponding to the device identification for representing the device relative-location within the vehicle; and
generating the maneuver-relative status based on the device relative-location.

13. The system as claimed in claim 11 wherein the control unit is for:
communicating vehicle-source data for identifying the vehicle-source data from the vehicle; and
generating the maneuver-relative status based on the vehicle-source data.

14. The system as claimed in claim 11 wherein the control unit is for:
generating a vehicle link status for representing an interaction between the device and the vehicle; and
generating the maneuver-relative status based on the vehicle link status.

15. The system as claimed in claim 11 wherein the control unit is for generating the device function profile including a feature profile for controlling the vehicle based on the device.

16. A non-transitory computer readable medium including instructions for a navigation system comprising:
accessing a device identification for identifying a device;
determining a contextual estimation for describing an event, a reason, a purpose, a goal or a combination thereof associated with the device;
generating a maneuver-relative status corresponding to the device identification with a control unit for representing the device associated with a person with designation of maneuvering a vehicle amongst multiple devices within the vehicle; and
generating a device function profile corresponding to the device identification based on the maneuver-relative status and the contextual estimation for enabling the person to control the device or the vehicle according to the maneuver-relative status.

17. The non-transitory computer readable medium as claimed in claim 16 wherein generating the maneuver-relative status includes:
identifying a cabin outline for representing the vehicle;
calculating a device relative-location relative to the cabin outline and corresponding to the device identification for representing the device relative-location within the vehicle; and
generating the maneuver-relative status based on the device relative-location.

18. The non-transitory computer readable medium as claimed in claim 16 wherein generating the maneuver-relative status includes:
communicating vehicle-source data for identifying the vehicle-source data from the vehicle; and
generating the maneuver-relative status based on the vehicle-source data.

19. The non-transitory computer readable medium as claimed in claim 16 wherein generating the maneuver-relative status includes:
generating a vehicle link status for representing an interaction between the device and the vehicle; and
generating the maneuver-relative status based on the vehicle link status.

20. The non-transitory computer readable medium as claimed in claim 16 wherein generating the device function profile includes generating the device function profile including a feature profile for controlling the vehicle based on the device.

* * * * *